US011915730B1

(12) United States Patent
Jesionowski et al.

(10) Patent No.: US 11,915,730 B1
(45) Date of Patent: Feb. 27, 2024

(54) MAGNETIC MEDIA DECOMMISSION MANAGEMENT IN A COMPUTER SYSTEM

(71) Applicant: INTERNATIONAL BUSINESS MACHINES CORPORATION, Amonk, NY (US)

(72) Inventors: Leonard G. Jesionowski, Tucson, AZ (US); Melanie Dauber, Oceanside, NY (US); Shawn M. Nave, Tucson, AZ (US); Benjamin K. Rawlins, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/333,851

(22) Filed: Jun. 13, 2023

(51) Int. Cl.
*G11B 5/31* (2006.01)
*G11B 5/78* (2006.01)

(52) U.S. Cl.
CPC .............. *G11B 5/3146* (2013.01); *G11B 5/78* (2013.01)

(58) Field of Classification Search
CPC ................................ G11B 5/3146; G11B 5/78
See application file for complete search history.

(56) References Cited

U.S. PATENT DOCUMENTS

| | | | | |
|---|---|---|---|---|
| 5,369,641 A | * | 11/1994 | Dodt | G06F 3/0601 |
| 7,123,444 B1 | * | 10/2006 | Solhjell | G11B 23/08714 |
| 7,359,153 B2 | | 4/2008 | Asano | |
| 8,194,349 B2 | * | 6/2012 | Sato | G11B 23/041 360/132 |
| 8,924,548 B2 | | 12/2014 | Frost et al. | |
| 9,330,729 B2 | | 5/2016 | McIntosh et al. | |
| 9,530,123 B1 | * | 12/2016 | Nave | G16Z 99/00 |
| 9,669,492 B2 | | 6/2017 | Linyaev et al. | |

(Continued)

FOREIGN PATENT DOCUMENTS

| | | |
|---|---|---|
| CN | 101637777 A | 2/2010 |
| CN | 103464441 A | 12/2013 |

(Continued)

OTHER PUBLICATIONS

"Linear Tape-Open", Wikipedia, [online] [retrieved 2023--xx-xx] https://en.wikipedia.org/windex.php?title=Linear_Tape-Open&oldid377299.

(Continued)

*Primary Examiner* — Brian E Miller
(74) *Attorney, Agent, or Firm* — KONRAD RAYNES DAVDA & VICTOR LLP; William K. Konrad

(57) ABSTRACT

A computer program product, device, system, and method are provided for decommissioning a tape cartridge internally within a tape library. In one embodiment automated tape cartridge decommissioning operations internal within a tape library, include receiving selection of a tape cartridge for decommissioning in a tape library and, using a tape library robotic accessor, moving a selected tape cartridge to a decommission workstation within the tape library. The selected tape cartridge is mounted to the decommission workstation and a fusing element of the decommission workstation is activated to fuse together layers of magnetic tape of the selected tape cartridge mounted to the decommission workstation, so that the selected tape cartridge is decommissioned within the tape library to have a decommissioned status.

20 Claims, 8 Drawing Sheets

(56) References Cited

U.S. PATENT DOCUMENTS

| | | | |
|---|---|---|---|
| 10,255,081 B2 | 4/2019 | Bijani et al. | |
| 11,278,939 B2 | 3/2022 | Pribble | |
| 11,682,422 B1* | 6/2023 | Rajaie | G11B 5/465 |
| | | | 360/66 |
| 2006/0039248 A1* | 2/2006 | Sasaki | G11B 15/689 |
| 2012/0198289 A1* | 8/2012 | Hostetter | G11B 5/00813 |
| | | | 714/E11.062 |
| 2014/0347764 A1* | 11/2014 | Miller | G11B 15/688 |
| | | | 360/72.3 |
| 2017/0293439 A1* | 10/2017 | Basham | G06F 16/2255 |
| 2020/0168246 A1* | 5/2020 | Biskeborn | G11B 5/584 |
| 2020/0272452 A1* | 8/2020 | Delange | G06F 8/65 |
| 2020/0336295 A1* | 10/2020 | Winarski | G11B 5/78 |
| 2021/0272589 A1* | 9/2021 | Rajaie | G11B 5/0245 |
| 2022/0208219 A1* | 6/2022 | Rajaie | H01F 13/006 |
| 2022/0334749 A1* | 10/2022 | Johnston | G06F 21/572 |
| 2022/0358967 A1 | 11/2022 | Miyamura et al. | |

FOREIGN PATENT DOCUMENTS

| | | |
|---|---|---|
| GB | 2173892 A | 10/1986 |
| KR | 200456507 Y1 | 11/2011 |

OTHER PUBLICATIONS

"LTO Library User's Guide", IBM Corporation, Document 21P9997, Jan. 2001, 74 pp.

O. Asmussen, et al., "IBM TS450048 R8 Tape Library Guide", IBM Corporation, RedBooks, Document SG24-8235-09, Mar. 2022, 518 pp.

U.S. Appl. No. 18/064,217, filed Dec. 9, 2022.

U.S. Appl. No. 18/333,820, filed Jun. 13, 2023.

List of Patents or Patent Applications Treated as Related, dated Jun. 13, 2023, 2 pp.

* cited by examiner

MAGNETIC MEDIA DECOMMISSION MANAGEMENT IN A COMPUTER SYSTEM

BACKGROUND OF THE INVENTION

1. Field of the Invention

The present invention relates to a computer program product, device, system, and method for magnetic media decommission management in a computer system.

2. Description of the Related Art

Automated tape libraries are large storage devices that have a robotic accessor that moves tape cartridges between magazine shelves and tape drives in the library. The tape drives are typically put in canisters which act as a sled or conveyance device to allow the tape drives to be more easily inserted and removed from the automated tape library as well as provide an interface for power and communications between the automated tape library and the tape drive. Very often these tape drive canisters 'hot dock' into the automated tape library such that as soon as the tape drive canister is fully seated into a slot in the automated tape library, the electrical connection is established between the tape drive canister and electronics of the automated tape library. The tape drive canisters are then held in this 'docked' position using some physical mechanism, such as a latch, thumbscrew, catch, friction fitting, etc.

Tape cartridges typically reach a point in time in which the cartridge is no longer used and is to be decommissioned. To preserve the security of data stored on the tape cartridge, various techniques have been developed to destroy the cartridge or destroy the data stored on the cartridge. For example, one known technique is to remove the cartridge from the tape library and physically destroy the cartridge such as by smashing it with a hammer. Another decommissioning technique is to remove the cartridge from the tape library and shred or burn the tape either within the cartridge or after the tape has been removed from the cartridge. Still another known decommissioning technique is to destroy just the data by degaussing the cartridge with a strong magnet which exposes the tape to a powerful magnetic field to scramble and purge data to prohibit playback of the data. If done properly, degaussing effectively destroys the data on tapes but allows reuse of tape cartridges that do not have prewritten servo tracks.

Some applications require decommissioning to meet certain standards such as using a National Security Agency/Central Security Service (NSA/CSS) approved degausser. Other standards may require incinerating tapes in a licensed incinerator. Furthermore, segregation of components (tape and reels or cassettes) may be necessary to comply with recycling requirements of a destruction facility.

SUMMARY

A first embodiment provides a computer program product, device and method for decommissioning a tape cartridge internally within a tape library. In one embodiment, automated tape cartridge decommissioning operations internal within a tape library, include receiving selection of a tape cartridge for decommissioning in a tape library and, using a tape library robotic accessor, moving a selected tape cartridge to a decommission workstation within the tape library. The selected tape cartridge is mounted to the decommission workstation and a fusing element of the decommission workstation is activated to fuse together layers of magnetic tape of the selected tape cartridge mounted to the decommission workstation, so that the selected tape cartridge is decommissioned within the tape library to have a decommissioned status.

In one embodiment, a reel of the tape cartridge carrying the magnetic tape of the cartridge is rotated while activating the fusing element of the decommission workstation to fuse together layers of the magnetic tape of the selected tape cartridge at different rotational areas of the magnetic tape on the tape cartridge reel.

In another aspect, the decommissioned tape cartridge is unmounted from the decommission workstation and, using the tape library robotic accessor, the decommissioned tape cartridge is moved from the decommission workstation within the tape library to a reading/writing workstation within the tape library. The decommissioned tape cartridge is mounted to a tape drive at the reading/writing workstation, and the tape drive is activated to attempt to read from the decommissioned tape drive mounted to the tape drive to confirm the decommissioned status of the decommissioned tape cartridge.

In another embodiment, following confirmation of the decommissioned status, the decommissioned tape cartridge is unmounted from the tape drive and, using the tape library robotic accessor, the decommissioned tape cartridge is moved from the reading/writing workstation within the tape library to a tape cartridge ejection workstation within the tape library. The decommissioned tape cartridge is ejected from the tape library at the ejection workstation.

In one embodiment, a decommission canister is configured to be accepted within a tape library canister bay and has a fusing element configured to fuse together at least a portion of layers of magnetic tape of a tape cartridge within the tape library, to decommission the tape cartridge within the tape library.

In one embodiment, the fusing element is a heating element adapted to emit heat directed at layers of magnetic tape of a tape cartridge to melt together at least a portion of layers of magnetic tape of a tape cartridge within the tape library wherein unwinding of the magnetic tape is inhibited. In another embodiment, an ultrasonic element is adapted to direct vibrational waves at layers of magnetic tape of a tape cartridge to weld together at least a portion of layers of magnetic tape of a tape cartridge within the tape library to decommission the tape cartridge.

In one aspect, the decommission canister has mechanical docking components adapted to mechanically secure the decommission canister to the tape library canister bay in a docked position within the tape library canister bay. In another aspect, the decommission canister has electrical docking components adapted to electrically connect the decommission canister to the tape library canister bay in a docked position within the canister bay.

Other aspects and advantages may be provided, depending upon the particular application.

DETAILED DESCRIPTION

Figure 1:
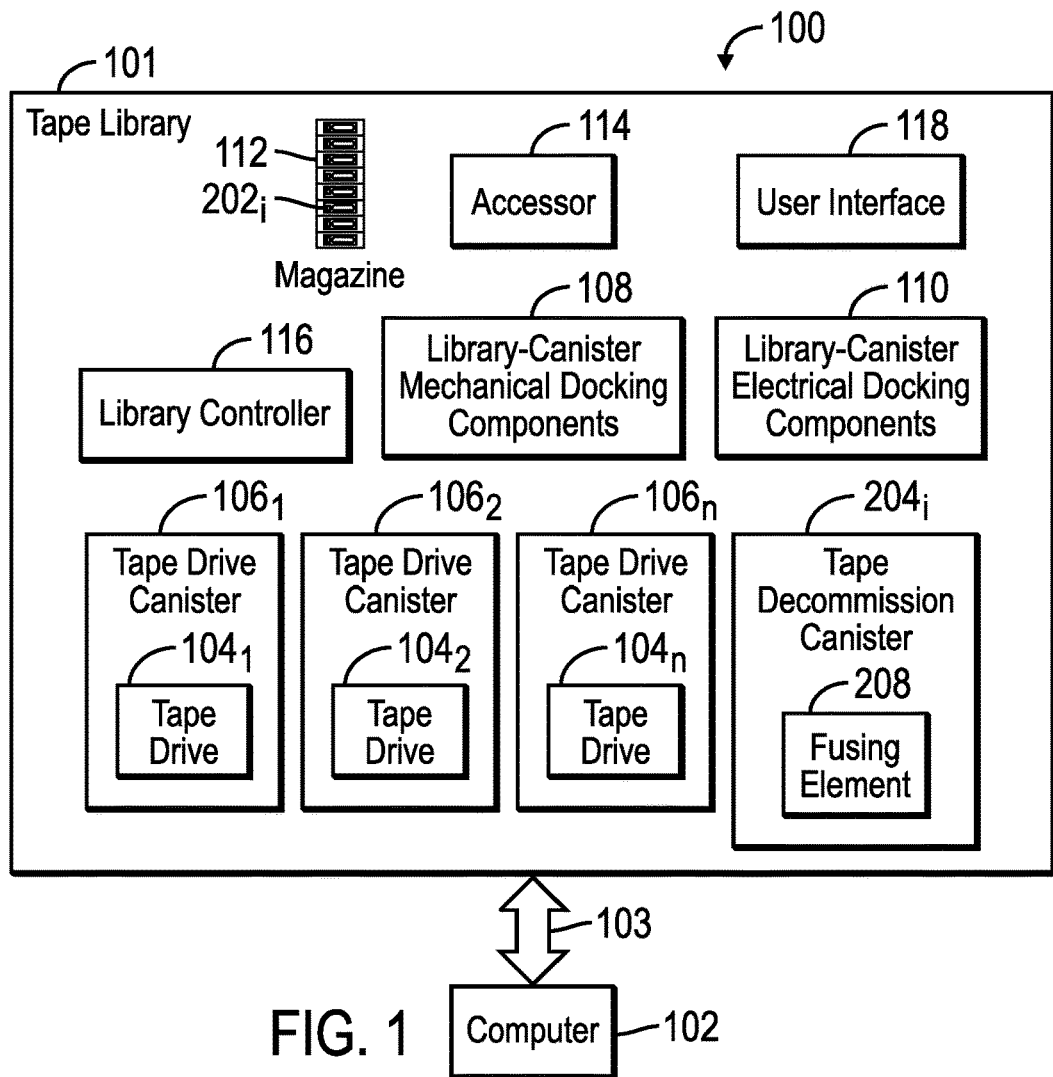
FIG. 1 illustrates an embodiment of a storage system which includes a tape library employing magnetic media decommissioning in accordance with the present description.

Described embodiments provide improvements to computer technology by providing for secure decommissioning of tape cartridges internally within the tape library. It is appreciated herein that known decommissioning processes that include removing fully functional tape cartridges from a tape library for the purpose of decommissioning the tape cartridges present a security risk. For example, if the tape cartridge removed from the tape library is mishandled due to human induced error, sensitive data stored on the tape cartridge may be compromised.

Magnetic media decommissioning in accordance with the present description, allows the tape cartridge to be securely decommissioned while it remains inside the tape library. In one embodiment, the internal decommissioning process includes fusing together layers of magnetic tape within the tape cartridge. The tape is sufficiently fused together to prevent unwinding of the tape from the cartridge spool and thus prevent reading of any data which may remain on the tape of the cartridge being decommissioned.

The internally decommissioned tape cartridge may then be safely ejected from the tape library. In one embodiment, the tape cartridge which was decommissioned internally within the tape library without human contact, may optionally be subjected to further decommissioning such as physical destruction or data destruction outside the tape library. However, because the tape cartridge has already been decommissioned to a significant extent internally within the tape library before it is handled by a human outside the tape library, any security risks due to human induced error, is reduced or eliminated. Moreover, in one embodiment, the internal tape cartridge decommissioning may be accomplished relatively quickly and at relatively low cost.

In another aspect of magnetic media decommissioning in accordance with the present description, a fusing element configured to fuse tape layers of a tape cartridge being decommissioned, may be disposed within a decommission canister having the same or similar outer configuration as known tape drives. Thus, the decommission canister may be readily docked in an open canister bay of the tape library in a manner similar to that of docking a tape drive in a tape library canister bay. As a result, tape libraries may be readily modified to employ internal decommissioning in accordance with the present description.

In yet another aspect of magnetic media decommissioning in accordance with the present description, the decommissioning process may be fully automated within the tape library. For example, a robotic accessor can grip a tape cartridge selected for decommissioning, and cause it to be mounted to a decommission canister in the same or similar manner that tape cartridges are robotically mounted to tape drives. Once the internal decommissioning process is completed, the robotic accessor can grip the decommissioned tape cartridge and unmount it from the decommission canister and move it to an ejection workstation to be ejected from tape library.

In still another aspect of magnetic media decommissioning in accordance with the present description, prior to ejecting the decommissioned tape cartridge from the tape library, the robotic accessor can move the decommissioned tape cartridge to a tape drive and cause it to be mounted to the tape drive. Successful decommissioning of the tape cartridge can be confirmed by using the tape drive to attempt to read data from the decommissioned tape cartridge. If the tape cannot be unwound from the tape cartridge spool due to fusing of layers of the tape performed in the decommission canister, reading of the tape cartridge is prevented and decommissioning of the cartridge is confirmed. Thus, the decommissioned tape cartridge may be safely ejected from the tape library with the risks of compromising sensitive data reduced or eliminated.

FIG. 1 illustrates an embodiment of a computer system 100 which includes an automated tape library 101 incorporating magnetic media decommission management in accordance with the present description. In this example, the tape library 101 is a Linear Tape Open (LTO) tape library such as the TS4500 marketed by IBM, which has been modified to decommission tape cartridges internally within the tape library 101 as described in greater detail below. It is appreciated that other types of tape libraries, both currently known tape libraries and tape libraries which may be subsequently developed, may be modified to incorporate magnetic media decommission management in accordance with the present description.

In this embodiment, the computer system 100 is an enterprise computer system in which aspects of magnetic media decommission management in accordance with the present description may be realized. Examples of enterprise-wide applications include, without limitation, banking transactions, payroll, warehouse, transportation, and batch jobs.

The computer system 100 includes a computer 102 coupled by a network 103 to the tape library 101. The computer 102, represents one or more of host computers, user computers, workstations, storage controllers, or other computers coupled to each other and to the tape library 101 by one or more networks 103. In one embodiment, a host computer coupled to the tape library 101 receives requests over a network from user computers to access data in tape cartridges $202_i$ (FIG. 2) internal to the tape library 101 using tape drives $104_1$, $104_2$, ... $104_n$ of the tape library 101. For example, a host generates input/output (I/O) operations which read data from or write date to the tape library 101 via a storage controller controlling the tape library 101. It is appreciated that other types of storage such as hard drives, for example, may employ magnetic media decommission management in accordance with the present description.

In one aspect of magnetic media decommission management in accordance with the present description, the automated tape library 101 includes one or more tape decommission canisters $204_i$ which permit tape cartridges $202_i$ to be decommissioned internally within the tape library 101.

As a result, tape cartridges need not be removed from the tape library in order to decommission them with attendant security risks of being handled outside the tape library 101 before being decommissioned.

In the illustrated embodiment, the tape decommission cannister $204_i$ decommissions a tape cartridge by melting or otherwise fusing together layers of magnetic tape within the cartridge so as to prevent or inhibit reading of data from the decommissioned tape cartridge by a tape drive. As a result, security risks of removal of tape cartridges $202_i$ from the tape library 101 prior to decommissioning the tape cartridges $202_i$ may be reduced or eliminated.

In the illustrated embodiment, each of the tape drives $104_1, 104_2, \ldots 104_n$ has a generally brick-shaped form factor and has been placed in a tape drive cannister $106_1, 106_2, \ldots 106_n$. Each tape drive canister $106_1, 106_2, \ldots 106_n$ acts as a sled or conveyance device to allow the associated tape drive to be more easily inserted into and removed from tape drive canister bays formed in the automated tape library. When fully inserted and accepted within a tape drive canister bay of the automated tape library 101, the canister $106_1, 106_2, \ldots 106_n$ and its associated tape drive $104_1, 104_2, \ldots 104_n$ are mechanically and electrically docked with the tape library 101. To mechanically secure each canister $106_1, 106_2, \ldots 106_n$ and its associated tape drive $104_1, 104_2, \ldots 104_n$ in the docked position within a tape library canister bay, the tape library 101 has library-canister mechanical docking components 108 which may be disposed upon a frame of the tape library, or on the canisters $106_1, 106_2, \ldots 106_n$, or both, depending upon the particular application. These library-cannister mechanical docking components 108 may include latches, for example, to latch a tape drive canister $106_1, 106_2, \ldots 106_n$ and its associated tape drive $104_1, 104_2, \ldots 104_n$ in the docked position within a tape library canister bay In one aspect of magnetic media decommission management in accordance with the present description, a tape decommission canister $204_i$ has an outer configuration which is substantially similar to that of each tape drive canister $106_1, 106_2, \ldots 106_n$. As a result, a tape decommission canister $204_i$ may be readily mechanically and electrically docked with the tape library 101 in the same or similar manner as each of the tape drive canisters $106_1, 106_2, \ldots 106_n$ and its associated tape drive $104_1, 104_2, \ldots 104_n$. Accordingly, the library-cannister mechanical docking components 108 used to mechanically dock the tape decommission canister $204_i$ to the tape library 101 may be substantially the same as the library-cannister mechanical docking components 108 used to mechanically dock each tape drive canisters $106_1, 106_2, \ldots 106_n$ to the tape library 101.

In the illustrated embodiment, the tape drive canisters $106_1, 106_2, \ldots 106_n$ and the associated library-canister mechanical docking components 108 used to mechanically dock the tape drive canisters $106_1, 106_2, \ldots 106_n$ within a tape drive canister bay of the tape library 101, have known configurations and are compatible with various existing tape libraries. Accordingly, known tape libraries may be readily modified by mechanically incorporating a tape decommission canister $204_i$ in accordance with the present description. For example, a tape decommission canister $204_i$ may readily be swapped to replace one or more tape drive canisters $106_1, 106_2, \ldots 106_n$ in an existing tape library or may be readily docked in an empty tape drive canister bay not occupied by a tape drive canister $106_1, 106_2, \ldots 106_n$ in an existing tape library, with little or no modification to known tape drive canister bays or library-canister mechanical components 108 of a tape library. In this manner, existing tape libraries may be readily modified to incorporate magnetic media decommission management in accordance with the present description. It is appreciated however that in other embodiments, a tape library may have a dedicated or custom decommission cannister bay or dedicated or custom library-canister mechanical docking components of the components 108, to mechanically accept a decommission canister for decommissioning tape cartridges in accordance with the present description.

Each tape drive cannister $106_1, 106_2, \ldots 106_n$ also provides an interface for power and communications between the automated tape library 101 and the associated tape drive carried within the associated cannister $106_1, 106_2, \ldots 106_n$. To secure electrical connections between each tape drive canister $106_1, 106_2, \ldots 106_n$ and its associated tape drive $104_1, 104_2, \ldots 104_n$ in the docked positions within a tape library bay, the tape library 101 has library-cannister electrical docking components 110 which may be disposed upon a frame of the tape library, or on the tape drive canisters $106_1, 106_2, \ldots 106_n$, or both, depending upon the particular application.

As noted above, in the illustrated embodiment, the tape decommission canister $204_i$ has an outer configuration which is substantially similar to that of each tape drive canister $106_1, 106_2, \ldots 106_n$. Here too, the library-cannister electrical docking components 110 used to electrically dock the tape decommission canister $204_i$ to the tape library 101 may be substantially the same as the library-cannister electrical docking components 110 used to electrically dock each tape drive canister $106_1, 106_2, \ldots 106_n$ to the tape library 101. For example, in the illustrated embodiment, both the tape decommission canister $204_i$ and the tape drive canisters $106_1, 106_2, \ldots 106_n$ and their associated tape drives utilize power provided by the tape library 101 and employ communication paths to and from the tape library 101. Accordingly, the library-cannister electrical docking components 110 used to electrically dock a tape decommission canister $204_i$ to the tape library 101, to provide power and communication paths, may be the same or substantially the same as the library-cannister electrical docking components 110 used to electrically dock the tape drive canisters $106_1, 106_2, \ldots 106_n$ to the tape library 101.

In the illustrated embodiment, the library-canister electrical docking components 110 used to dock the tape drive canisters $106_1, 106_2, \ldots 106_n$ to the tape library 101 have known configurations and are compatible with existing tape libraries and existing tape drive canisters. Accordingly, known tape libraries may be readily modified to electrically incorporate a tape decommission canister $204_i$ in accordance with the present description as well as tape drive canisters $106_1, 106_2, \ldots 106_n$. For example, a tape decommission canister $204_i$ may readily be swapped for and thus replace one of the tape drive canister $106_1, 106_2, \ldots 106_n$ in an existing tape library or may be readily docked into an empty bay not already occupied by a tape drive canister $106_1, 106_2, \ldots 106_n$ in an existing tape library. In this manner, existing tape libraries may be readily modified to incorporate magnetic media decommission management in accordance with the present description. It is appreciated however that in other embodiments, a tape library may have a dedicated or custom decommission cannister bay or dedicated or custom library-canister electrical docking components of the components 110, to electrically accept a decommission canister for decommissioning tape cartridges in accordance with the present description. In one embodiment, at least one tape library canister bay is configured to mechanically and electrically accept a tape drive canister or a decommission canister, interchangeably.

In the illustrated embodiment, the tape library 101 has one or more tape magazines 112 of storage slots or shelves, each storage shelf capable of storing a tape cartridge $202_i$. In addition, the tape library 101 of the illustrated embodiment is fully automated such that it includes a robotic accessor 114 controlled by a programmed library controller 116. A robot picker assembly of the robotic accessor 114 is controlled by the library controller 116, to grab a tape cartridge in the magazine 112 and move the tape cartridge to another magazine or another storage shelf within a magazine. In some embodiments, the tape library 101 may employ a bar code reader to read bar codes on the tape cartridge $202_i$ label to ensure that the desired tape cartridge has been grabbed.

The library controller 116 is further programmed to control the robotic accessor 114 to move a tape cartridge to one of the tape drives $104_1, 104_2 \ldots 104_n$ to read data from or write data to the tape cartridge. Thus, in response to an input/output (I/O) request directed to the tape library 101, the library controller 116 is programmed to select a target tape cartridge from the magazine 112, move the selected tape cartridge from the magazine 112 to a selected tape drive $104_1, 104_2 \ldots 104_n$, and mount the selected tape cartridge in the selected tape drive using the robotic accessor 114. The library controller 116 is programmed to operate that tape drive to read data from or write data to the tape cartridge mounted in the selected tape drive. These operations can be performed by the tape library 101 in a fully automated fashion in response to an I/O request directed to the tape library 101, as known by those skilled in the art. In this embodiment, the tape library 101 includes a user interface 118 such as a graphical user interface (GUI) or a command line interface (CLI) by which a user can input commands such as, for example, commands to enable tape cartridge decommissioning and select tape cartridges for decommissioning internally within the tape library 101, as described below. It is appreciated that such a user interface may be provided by other computational devices such as the computer 102 coupled by the network 103 to the tape library 101.

Figure 2:
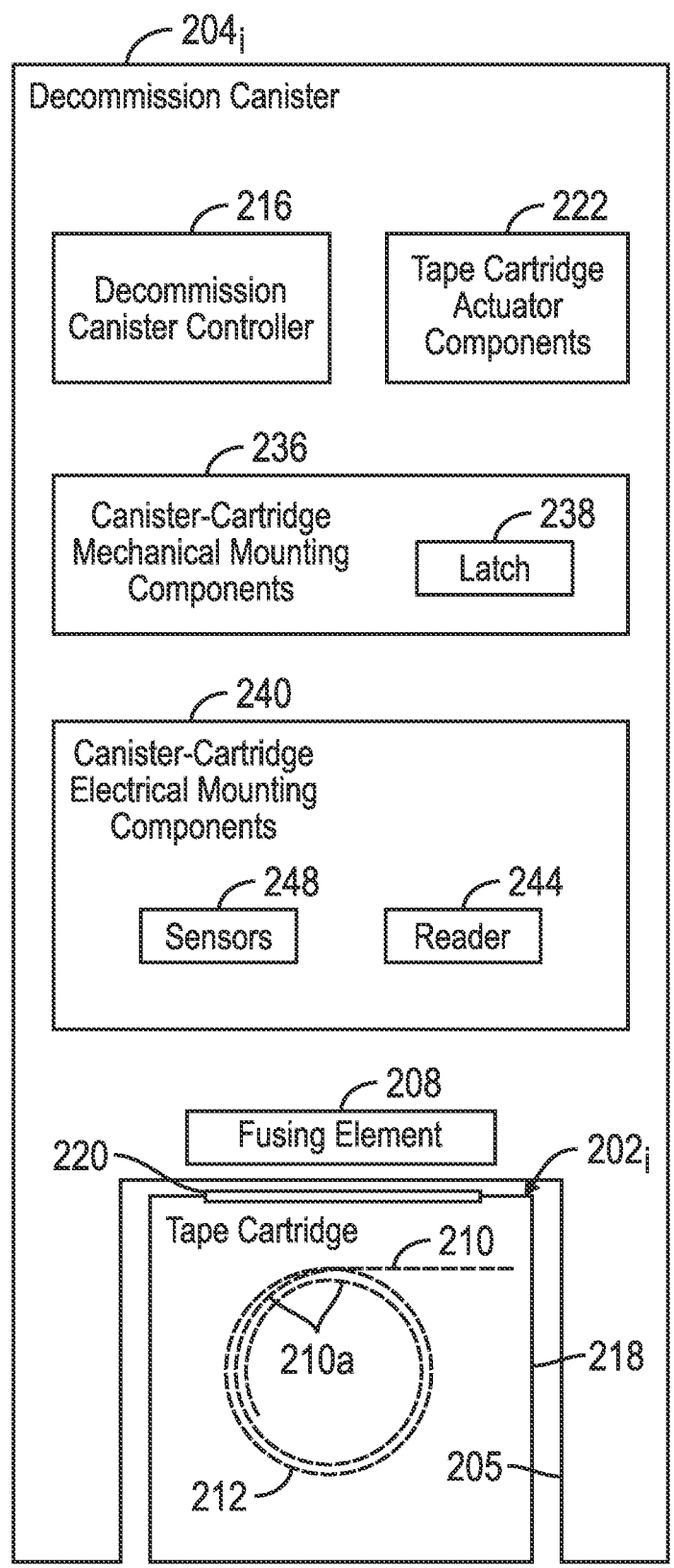
FIG. 2 illustrates an embodiment of a decommission canister for the tape library of FIG. 1, employing magnetic media decommissioning in accordance with the present description.

In one aspect of magnetic media decommission management in accordance with the present description, the library controller 116 is further programmed to control the robotic accessor 114 to move a tape cartridge selected for decommissioning to a decommission canister $204_i$ (FIGS. 1, 2). In a manner similar to that described above in connection with tape drives, in response to a command directed to the tape library 101 to decommission a particular tape cartridge instead of reading or writing data from a tape cartridge, the library controller 116 is programmed to select a target tape cartridge from the magazine 112, move the selected tape cartridge from the magazine 112 to the decommission canister $204_i$ (FIGS. 1, 2) and mount the selected tape cartridge to the decommission canister $204_i$ using the robotic accessor 114. The library controller 116 is further programmed to operate decommission canister $204_i$ to decommission the selected tape cartridge mounted in the decommission canister $204_i$ by fusing together layers of magnetic tape of the tape cartridge to inhibit or prevent reading of data from the tape cartridge. In one aspect of tape cartridge decommission management in accordance with the present description, these operations can be performed by the tape library 101 in a fully automated fashion and completely internal to the tape library 101, in response to a decommission command directed to the tape library 101. As a result, removal of a tape cartridge from the tape library to initiate decommissioning of the tape cartridge may be avoided. Instead, the tape cartridge is removed from the tape library after the decommissioning process by the decommission canister has been completed, preserving security of data which may have been written on the tape cartridge.

FIG. 2 illustrates in schematic form, an embodiment of a decommission canister $204_i$ with a tape cartridge $202_i$ mounted to the decommission canister $204_i$ for decommissioning. In this example, the library controller 116 (FIG. 1) has received a command directed to the tape library 101 to decommission the tape cartridge $202_i$ of FIG. 2. Accordingly, the library controller 116 has selected the tape cartridge $202_i$ from the magazine 112, caused the robotic accessor 114 (FIG. 1) to move the selected tape cartridge $202_i$ from the magazine 112 to the decommission canister 204i and to mount the tape cartridge $202_i$ within a slot 205 the decommission canister 204i as shown in FIG. 2.

The library controller 116 is programmed to operate decommission canister 204i to decommission the selected tape cartridge mounted in the decommission canister $204_i$. In the embodiment of FIG. 2, the decommission canister $204_i$ includes a fusing element 208 which decommissions the mounted tape cartridge $202_i$ by fusing together layers of magnetic tape 210 of the tape the tape cartridge $202_i$ to inhibit or prevent reading of data from the tape cartridge after decommissioning. In one embodiment, the fusing element 208 includes a heating element adapted to emit sufficient heat directed at layers of magnetic tape 210 of the tape cartridge $202_i$ to melt together at least a portion of outer layers 210a of magnetic tape wound on a reel 212 of the tape cartridge $202_i$. In an alternative embodiment, the fusing element 208 includes an ultrasonic element adapted to direct sufficient vibrational waves at the wound layers of magnetic tape 210 of the tape cartridge to weld together at least a portion of outer layers 210a of magnetic tape 210 of the tape cartridge within the tape library 101. Whether tape layers are melted, welded or otherwise fused, the decommissioning prevents unwinding of the magnetic tape which prevents reading of any data from the decommissioned tape cartridge.

In the embodiment of FIG. 2, the fusing element 208 is controlled by a decommission canister controller 216 which activates the fusing element 208 in response to control signals provided by the library controller 116. Tape cartridges such as the tape cartridge $202_i$ typically have an outer shell 218 housing the magnetic tape 210. In one aspect of tape cartridge decommission management in accordance with the present description, the decommission canister controller 216 is programmed to limit and control activation of the fusing element 208 so as to prevent melting of the tape cartridge outer shell 218, yet assure sufficient fusing together of outer layers of the tape 210 to prevent unwinding of the tape.

Tape cartridges such as the tape cartridge $202_i$ often have a door 220 which when opened, provides access to the tape 210 within the tape cartridge for a read/write head of a tape drive for read or write operations when the tape cartridge is mounted to a tape drive. As a result, tape drives typically include catches or other mechanisms adapted to open and close a tape cartridge door of a tape cartridge being mounted to the tape drive to provide access to the tape disposed in the interior of the tape cartridge for the read/write head of the tape drive for read/write operations. In one embodiment in a manner substantially similar to that of tape drives, the door 220 is opened by a catch located inside the decommissioning canister 204i such that the door is automatically opened as the robotic accessor 114 loads the tape cartridge 202i into the decommissioning canister 204i." As a result, the opening of the cartridge door 220 exposes the interior tape 210 of the tape cartridge $202_i$ to the fusing element 208 for decommissioning processes. In another embodiment of tape cartridge decommission management in accordance with the present description, the decommission canister $204_i$ may include tape cartridge actuator components 222 which are adapted to open the door 220 under the control of the decommission canister controller 216, to expose the interior tape 210 of the tape cartridge $202_i$ to the fusing element 208 for decommissioning processes. In one embodiment, the tape cartridge actuator components 222 may be the same or similar to tape cartridge actuator components of tape cartridges and tape drives, depending upon the particular application.

Tape cartridge actuator components of known tape drives are typically also adapted to rotate the reel or reels carrying the magnetic tape of a tape cartridge mounted to the tape drive to provide access to different portions of the tape disposed in the interior of the tape cartridge for the read/write head of the tape drive for read/write operations. In another aspect of tape cartridge decommission management in accordance with the present description, the tape cartridge actuator components 222 of the decommission canister $204_i$ are also adapted to under the control of the decommission canister controller 216, to rotate the reel 212 of a tape cartridge mounted to the decommission canister $204_i$. In this manner, the tape cartridge actuator components 222 under the control of the decommission canister control 216 can expose different areas of the interior tape 210 of the tape cartridge $202_i$ to the fusing element 208 for decommissioning processes. As a result, different portions of the tape layers wound on the reel 212 may be fused together to ensure that the tape 210 cannot be unwound from the reel 212 sufficiently to be read. As noted above, in one embodiment, the tape cartridge actuator components 222 may be the same or similar to tape cartridge actuator components of tape drives, depending upon the particular application.

When fully inserted and accepted within a tape drive of the automated tape library 101, a tape cartridge $202_i$ is mechanically and electrically mounted within the tape drive by cartridge mounting components in a known fashion. In the illustrated embodiment, tape drives and the associated tape drive cartridge mounting components used to mechanically and electrically mount a tape cartridge $202_i$ within a tape drive of the tape library 101, have known configurations and are compatible with various existing tape cartridges.

In one aspect of magnetic media decommission management in accordance with the present description, a tape cartridge such as the tape cartridge $202_i$ when fully inserted and accepted within decommission canister $204_i$ of the automated tape library 101, is also mechanically and electrically mounted to the decommission canister $204_i$. To mechanically secure each the tape cartridge $202_i$ in the mounted position within the decommission canister $204_i$, the decommission canister $204_i$ has canister-cartridge mechanical mounting components 236 which may be disposed upon a frame of the decommission canister $204_i$, or on the tape cartridge $202_i$, or both, depending upon the particular application.

In one embodiment, the canister-cartridge mounting components 236 include a tape cartridge loading mechanism 532 (FIGS. 5A, 5C) which load the tape cartridge into the slot 205, and latches 238, for example, to latch the tape cartridge $202_i$ in the mounted position within the decommission canister $204_i$ as schematically represented in FIG. 2. In one embodiment, the canister-cartridge mechanical mounting components 236 may be the same or similar to those of known tape drive cartridge mounting components, depending upon the particular application. In another embodiment the canister-cartridge mechanical mounting components 236 may be modified so as to be different from those of known tape drive cartridge mounting components, to accommodate the decommissioning function of the decommission canister $204_i$, as compared to the read/write function of a tape drive.

Tape cartridges which meet the LTO standard typically have a cartridge memory chip inside the tape cartridge. This cartridge memory can be read from or written to via a non-contacting passive 13.56 MHz RF interface. Data stored in the cartridge memory can be used for example to identify tapes and to store tape-use information. Tape drives which meet the LTO standard typically have a cartridge memory RF interface to read data from and write data to the cartridge memory.

In one aspect of magnetic media decommission management in accordance with the present description, the decommission canister $204_i$ also provides an interface for power and communications between the decommission canister controller 216 and a tape cartridge $202_i$ mounted to the decommission canister $204_i$. To secure electrical connections between decommission canister $204_i$ and the tape cartridge $202_i$ mounted in the decommission canister $204_i$, the decommission canister $204_i$ has cannister-cartridge electrical mounting components 240 which may be disposed upon a frame of the decommission canister $204_i$, or on the tape cartridge $202_i$ or both, depending upon the particular application. For example, for tape cartridges which meet the LTO standard, the cannister-cartridge electrical mounting components 240 may include a reader 244 which provides non-contacting passive 13.56 MHz RF interface in accordance with the LTO standard for reading data from or writing data to a memory chip of an LTO tape cartridge. Data read from the cartridge memory may include for example, data identifying the tape cartridge mounted in the decommission canister $204_i$. Data written to the cartridge memory may include for example, the date of decommissioning of the tape cartridge mounted in the decommissioning canister $204_i$.

In one embodiment, the canister-cartridge electrical mounting components 240 may be the same or similar to those of known tape drive cartridge mounting components, depending upon the particular application. In another embodiment the canister-cartridge electrical mounting components 240 may be modified so as to be different from those of known tape drive cartridge mounting components, to accommodate the decommissioning function of the decommission canister $204_i$, as compared to the read/write function of a tape drive.

For example, as previously mentioned, in one embodiment, the decommission controller 216 is programmed to limit and control activation of the fusing element 208 so as to prevent melting of the tape cartridge outer shell 218, yet assure sufficient fusing together of outer layers of the tape 210 to prevent unwinding of the tape for reading. To facilitate such control, the cannister-cartridge electrical mounting components 240 may include appropriate temperature sensors 248 positioned to sense the temperature of the tape 210 and the tape cartridge shell 218 when the tape cartridge $202_i$ is mounted to the decommission canister $204_i$. In this manner, the temperature of the tape 210 and the tape cartridge shell 218 may be monitored by the decommission canister controller 216 using the temperature sensors 248. The fusing element 208 may be activated by the controller 216 to ensure that the temperature of the tape 210 reaches a sufficient melting point to fuse tape layers together. Conversely, the fusing element 208 may be deactivated by the controller 216 before the temperature of the shell 218 reaches an imminent melting point. It is appreciated that the canister-cartridge electrical mounting components 240 may have other functions, depending upon the particular application.

Figure 3:
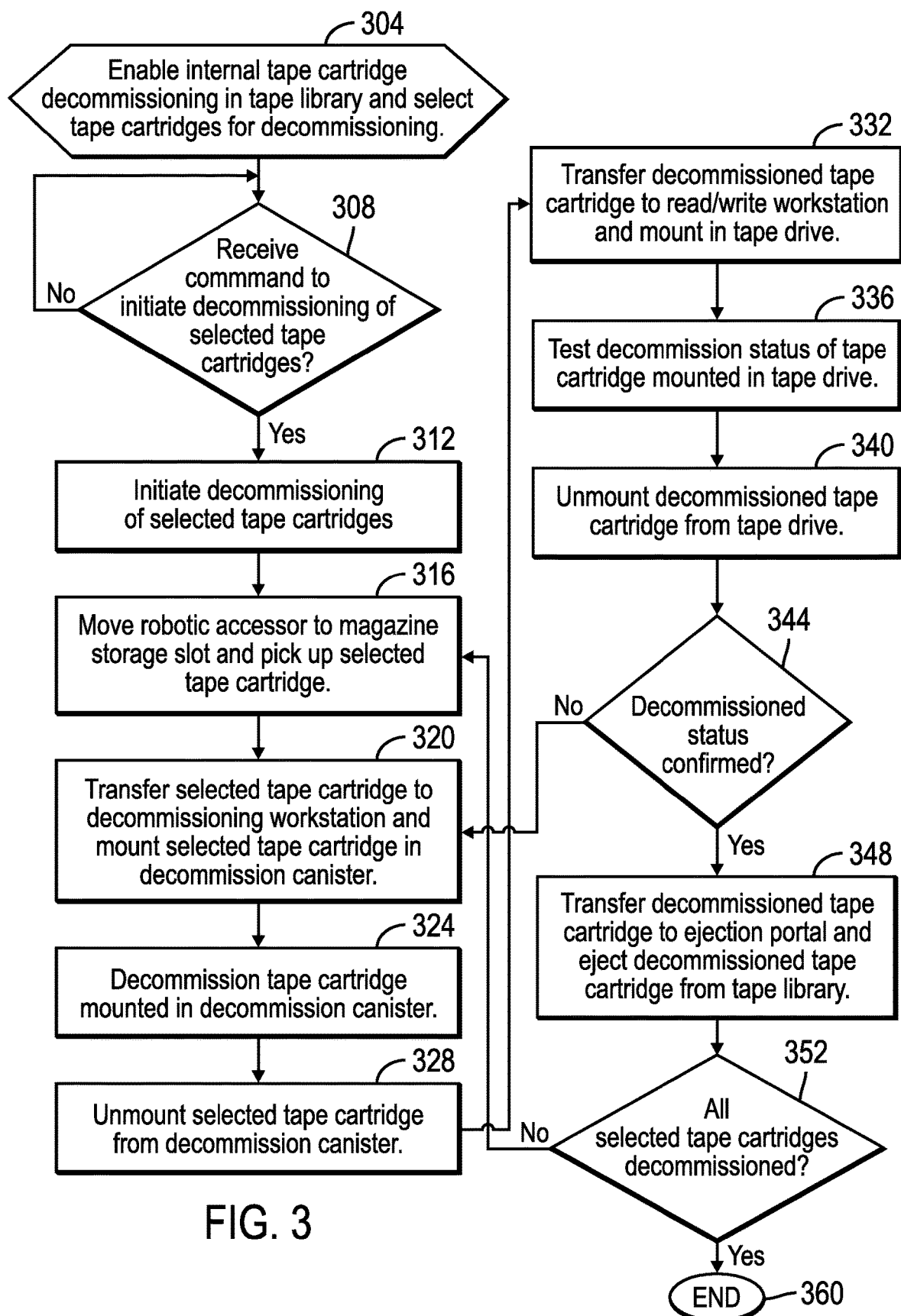
FIG. 3 illustrates an embodiment of operations of the tape library of FIG. 1, employing magnetic media decommissioning in accordance with the present description.

FIG. 3 depicts one example of operations of the library controller 116 (FIG. 1) and decommission canister controller 216 (FIG. 2) of the library 101 (FIG. 1) for tape cartridge decommission management in accordance with the present description. As shown in FIG. 3, the tape cartridge decommission operations controlled by the controllers 116, 216 of this embodiment are represented by blocks 304-360 of FIG. 3. In this example, the automated tape library 101 includes one or more tape cartridges $202_i$ which the user intends to decommission because the cartridges are no longer needed but contain stored data of a sensitive nature. As previously noted, decommission canister $204_i$ of the tape library 101 permits tape cartridges $202_i$ to be decommissioned internally within the tape library 101. As a result, tape cartridges need not be removed from the tape library in order to decommission them with attendant security risks of being handled outside the tape library 101 before being decommissioned.

In the illustrated embodiment, internal tape cartridge decommissioning is enabled (block 304, FIG. 3) for selected tape cartridges $202_i$ in response to instructions or commands issued to the library controller 116 the tape library 101, Cartridges selected for decommissioning may be identified by cartridge number or other suitable identification (ID). Commands may be provided to the tape library 101 by a user through a suitable user interface 118 (FIG. 1) of the tape library 101, such as a graphical or command line user interface, for example. In the illustrated embodiment, the user provides a list of tape cartridges to be decommissioned and in response, the automated tape library 101 automatically decommissions the selected tape cartridges as described below without further instructions from the user. However, it is appreciated that in other embodiments, the user may manually provide commands or instructions to the tape library for one or more operations of the tape cartridge decommissioning process.

Figure 4:
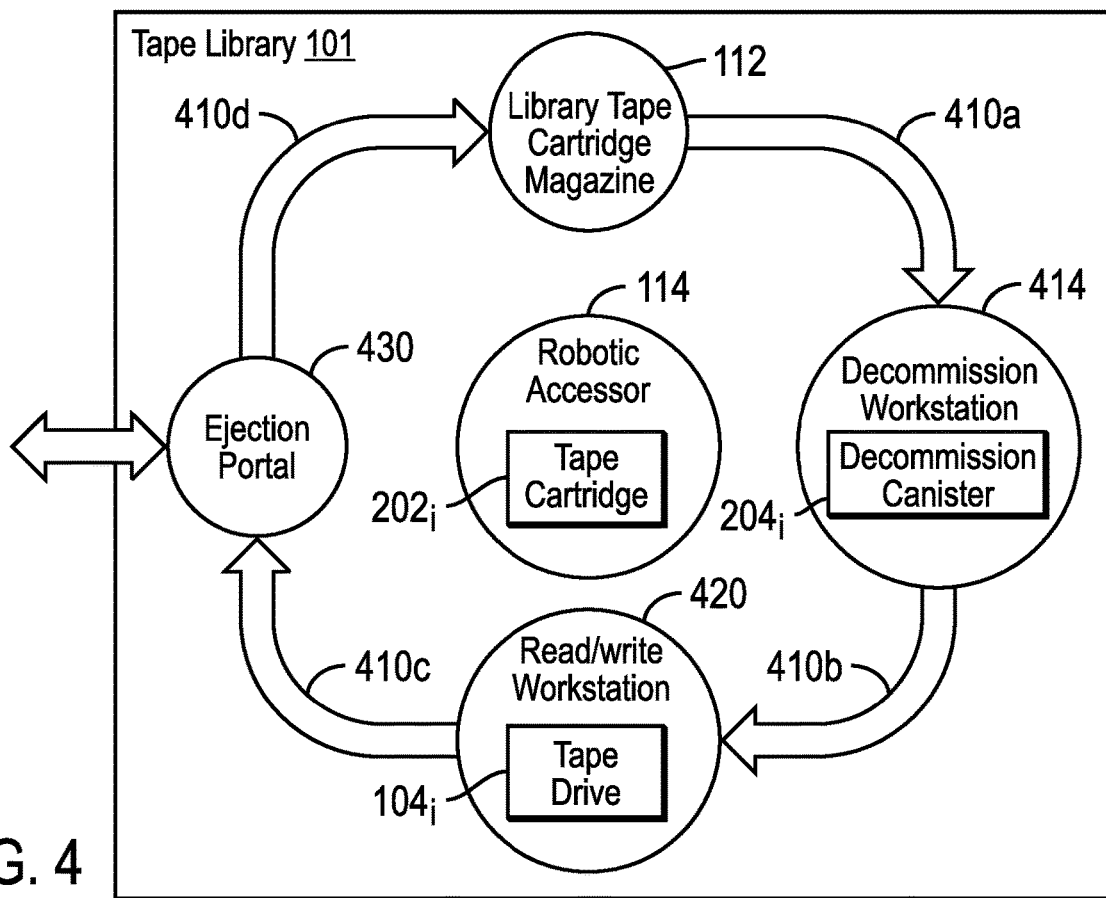
FIG. 4 illustrates an embodiment of paths of operations of a robotic accessor of the tape library of FIG. 1, employing magnetic media decommissioning in accordance with the present description.

In response to receipt (block 308) of a command to initiate decommissioning of a selection of tape cartridges, the tape library 101 initiates (block 312, FIG. 3) the internal tape cartridge decommissioning process and moves (block 316, FIG. 3) the robotic accessor 114 (FIG. 1) to a storage shelf of the magazine 112 (FIG. 1) to pick up the selected tape cartridge $202_i$ from its storage shelf of the magazine 112. FIG. 4 depicts in schematic form movement paths 410a-410d of a selected tape cartridge $202_i$ by the robotic accessor 114 in the tape cartridge internal decommissioning process.

Having picked up the selected tape cartridge $202_i$ from its magazine storage shelf, the robotic accessor 114 transfers (block 320, FIG. 3) the selected tape cartridge $202_i$ in a path schematically represented by the path 410a (FIG. 4) to decommission workstation 414 (FIG. 4) which includes a decommission canister $204_i$ docked in a canister bay of the tape library 101. In the illustrated embodiment, the path 410a may include a bar code reader, for example, to confirm that the tape cartridge $202_i$ being carried by the robotic accessor 114 is the tape cartridge selected for decommissioning.

In a manner similar to known techniques for mounting a tape cartridge in a tape drive, the robotic accessor 114 inserts the selected tape cartridge $202_i$ into the decommission canister $204_i$ so that it is mounted within the decommission canister $204_i$. In the illustrated embodiment, the robotic accessor releases the tape cartridge $202_i$ once it is mounted within the decommission canister $204_i$. However, in some embodiments, the tape cartridge $202_i$ mounted to the decommission canister $204_i$ may remain gripped by the robotic accessor 114.

As noted above, canister-cartridge mounting components 236 (FIG. 2) of the decommission canister $204_i$ may include latches 238 in the illustrated embodiment, to latch the tape cartridge $202_i$ in the mounted position within the decommission canister $204_i$ as schematically represented in FIG. 2. Canister-cartridge electrical mounting components 240 (FIG. 2) of the decommission canister $204_i$ may include a reader 244 (FIG. 2) to identify and confirm that the tape cartridge $202_i$ mounted in the decommission canister $204_i$ is the tape cartridge selected for decommissioning.

Having mounted the selected tape cartridge $202_i$ in the decommission canister $204_i$, the selected tape cartridge $202_i$ is decommissioned (block 324, FIG. 4). In this embodiment, in a manner similar to known techniques for opening a door of a tape cartridge mounted in a tape drive, the door of the tape cartridge is opened to expose the tape 210 in the interior of the tape cartridge $202_i$ to the fusing element 208 for decommissioning the cartridge. Once activated by the decommission canister controller 216, the fusing element 208 fuses together layers of the magnetic tape 210 (FIG. 2) of the tape cartridge $202_i$ mounted in the decommission canister $204_i$, to inhibit or prevent reading of data from the tape cartridge. The tape cartridge $202_i$ is decommissioned in this manner. It is appreciated that in some embodiments, the tape cartridges to be decommissioned may lack a door.

As noted above, in one embodiment, the fusing element 208 includes a heating element adapted to emit sufficient heat directed at layers of magnetic tape 210 of the tape cartridge 202i to melt together at least portions of outer layers of magnetic tape wound on a reel 212 of the tape cartridge 202i. In an alternative embodiment, an ultrasonic element directs sufficient vibrational waves at the wound layers of magnetic tape 210 of the tape cartridge to weld together at least portions of outer layers of magnetic tape 210 of the tape cartridge within the tape library 101. Other techniques may be used to fuse layers together. Whether tape layers are melted, welded or otherwise fused, the decommissioning prevents unwinding of the magnetic tape which prevents reading of any data from the decommissioned tape cartridge. In one aspect of tape cartridge decommission management in accordance with the present description, the decommission controller 216 is programmed to limit and control activation of the fusing element 208 so as to prevent melting of the tape cartridge outer shell 218, yet assure sufficient fusing together of outer layers of the tape 210 to prevent unwinding and reading of the tape.

In one embodiment, the decommission canister controller 216 may optionally control the tape cartridge actuator components 222 of the decommission canister 204i to rotate the reel 212 of a tape cartridge as the fusing element 208 fuses together magnetic tape. In this manner, different areas of the tape 210 within the interior of the tape cartridge $202_i$ can be exposed to the fusing element 208 to enhance the decommissioning processes. For example, different portions of the tape layers wound on the reel 212 may be fused together to further ensure that the tape 210 cannot be unwound from the reel 212 and read. Once decommissioning is completed, appropriate decommissioning data such as for example, the date of decommissioning of the tape cartridge mounted in the decommissioning canister $204_i$, may optionally be written to the cartridge memory chip.

Upon completion of the decommissioning of the tape cartridge $202_i$, the tape library 101 prepares the tape cartridge $202_i$ to be unmounted (block 328, FIG. 3) from the decommission canister $204_i$. If the mounted tape cartridge has a door, such as the door 220 (FIG. 2), the door of the tape cartridge is closed as it unmounts. To unmount the tape cartridge $202_i$ from the decommission canister $204_i$, in a manner similar to unmounting a tape cartridge from a tape drive, the robotic accessor 114 grips the selected tape cartridge to withdraw it from the decommission canister $204_i$. In addition, the decommission canister $204_i$ electrically decouples from the tape cartridge and mechanically releases the tape cartridge, to permit it to be withdrawn by the robotic accessor 114 from the decommission canister $204_i$. In one embodiment, the robotic accessor 114 actuates the latches 238 to unlatch and unmount the decommissioned tape cartridge from the decommission canister $204_i$. In another embodiment, unlatching of the latches 238 may be controlled by the decommission canister controller 216.

Having picked up the selected tape cartridge $202_i$ from the decommission canister $204_i$, the robotic accessor 114 transfers (block 332, FIG. 3) the decommissioned tape cartridge $202_i$ in a path schematically represented by the path 410b (FIG. 4) to a read/write workstation 420 (FIG. 4) which includes tape drive $104_i$. In the illustrated embodiment, the tape drive $104_i$ is housed by a tape drive canister $106_i$ (FIG. 1) docked in a tape drive canister bay of the tape library 101. In this example, the robotic accessor path 410b may include a bar code reader, for example, to confirm that the tape cartridge being carried by the robotic accessor 114 is the tape cartridge which has been decommissioned.

In a manner the same as or similar to that of known techniques for mounting a tape cartridge in a tape drive, the robotic accessor 114 inserts the previously decommissioned tape cartridge $202_i$ into the tape drive $104_i$ of the tape drive canister $106_i$ (FIG. 1) so that it is mounted (block 332, FIG. 3) within the tape drive $104_i$, and then releases the tape cartridge mounted within the tape drive $104_i$. In the illustrated embodiment, the tape drive $104_i$ may include latches to latch the tape cartridge $202_i$ in the mounted position within the tape drive $104_i$ in a known manner. Canister-cartridge electrical mounting components 240 of the tape drive $104_i$ may include a reader to identify and confirm that the tape cartridge $202_i$ mounted in the tape drive $104_i$ is the tape cartridge $202_i$ which was previously decommissioned in the decommission workstation 414 as described above.

Once mounted in the tape drive, the decommissioning of the tape cartridge by the decommission canister $204_i$ may be tested (block 336, FIG. 3) by the tape drive. In this embodiment, in a manner the same as or similar to known techniques for opening a door of a tape cartridge mounted in a tape drive, the door of the tape cartridge $202_i$ is opened to expose the tape within the interior of the tape cartridge $202_i$ to a read/write head of the tape drive $104_i$. Tape cartridge actuator components of known LTO tape drives such as the tape drive $104_i$ typically include mechanisms to grasp the end of the magnetic tape wound on the reel of the tape cartridge mounted in the tape drive to initiate reading of the magnetic tape. Absent tape cartridge internal decommissioning in accordance with the present description, tape drive mechanisms rotate the reel or reels carrying the magnetic tape of a tape cartridge mounted to the tape drive to provide access to different portions of the tape disposed in the interior of the tape cartridge for the read/write head of the tape drive for read/write operations. However, in this example, the tape cartridge $202_i$ mounted in the tape drive $104_i$ was previously decommissioned in the decommission canister $204_i$ as described above when it was mounted in the decommission canister $204_i$ as depicted in FIG. 2. As a result, one or more portions of outer layers wound on the reel 212 (FIG. 2) have been fused together so as to prevent the tape 210 from being unwound from the reel 212 by the tape drive $104_i$ when the tape cartridge $202_i$ is mounted in the tape drive $104_i$ (FIG. 4).

In one aspect of tape cartridge internal decommissioning in accordance with the present description, successful decommissioning of the tape cartridge $202_i$ by the decommission canister $204_i$ may be confirmed by the tape drive $104_i$ in the read/write workstation 420. More specifically, the tape drive $104_i$ is caused to attempt to read data from the decommissioned tape cartridge $202_i$ mounted in the tape drive $104_i$ of the workstation 420 (FIG. 4). If the tape cartridge $104_i$ has been successfully decommissioned, one or more portions of outer layers of tape wound on the reel 212 (FIG. 2) will have been fused together so as to prevent the tape 210 from being unwound from the reel 212 by the tape drive $104_i$ when an attempt is made to read data from the tape 210. In this manner, the decommissioning status of the tape cartridge $202_i$ is confirmed as successful if the attempt by the tape drive $104_i$ to read data from the decommissioned tape cartridge $202_i$ is unsuccessful because the tape 210 cannot be unwound from the reel or reels 212 of the tape cartridge.

Upon completion of the tape cartridge decommissioning test, the tape drive $104_i$ prepares the tape cartridge $202_i$ to be unmounted (block 340, FIG. 3) from the tape drive $104_i$. Actuator components of the tape drive $104_i$ using known techniques, release the end of the magnetic tape wound on the reel of the tape cartridge and the door 220 of the decommissioned tape cartridge $202_i$ is closed as the cartridge is unmounted.

In a manner the same as or similar to known techniques for unmounting a tape cartridge from a tape drive, the robotic accessor 114 grips the selected tape cartridge and withdraws it from the tape drive $104_i$ so that it is unmounted from the tape drive $104_i$. To unmount the tape cartridge from the tape drive $104_i$, the tape drive $104_i$ electrically decouples from the tape cartridge and mechanically releases the tape cartridge, to permit it to be withdrawn from the tape drive $104_i$. In one embodiment, the robotic accessor 114 actuates latches to unlatch and unmount the decommissioned tape cartridge from the tape drive. In another embodiment, unlatching of the latches may be controlled by the tape drive $104_i$.

If the tape cartridge decommissioning test (block 336, FIG. 3) confirms (block 344, FIG. 3) that the tape cartridge $202_i$ was successfully decommissioned, the robotic accessor 114 having picked up the selected tape cartridge $202_i$ from the tape drive $104_i$, transfers (block 348, FIG. 3) the decommissioned tape cartridge $202_i$ in a path schematically represented by the path 410c (FIG. 4) to an ejection portal 430 to be ejected from the tape library 101 after being released by the robotic accessor 114. Once ejected from the tape library, the tape cartridge $202_i$ is subject to direct access by personnel. However, because the tape cartridge $202_i$ has been decommissioned internally within the tape library 101 prior to being ejected, any attendant security concerns are reduced or eliminated.

A determination is made as to whether (block 352, FIG. 3) all tape cartridges selected for decommissioning, have completed the internal decommissioning process of the tape library 101. If not, the tape library 101 continues the internal tape cartridge decommissioning process for the next selected tape cartridge. Thus, the robotic accessor 114 moves in a path schematically represented by the path 410d (FIG. 4) to a storage shelf of the magazine 112 (FIG. 1) to pick up the next selected tape cartridge $202_i$ from its storage shelf of the magazine 112. Having picked up the next, selected tape cartridge 202, from the its magazine storage shelf, the robotic accessor 114 transfers (block 320, FIG. 3) the selected tape cartridge 202, in a path schematically represented by the path 410a (FIG. 4) to the decommission workstation 414 (FIG. 4) to decommission that tape cartridge as described above. If it is determined (block 352, that all selected tape cartridges have been successfully decommissioned, decommissioning selected cartridges internally within the tape library 101 ends (block 360, FIG. 3) until additional tape cartridges are selected (block 304, FIG. 3) for decommissioning.

In one embodiment, the user may elect to subject the ejected and decommissioned tape cartridges 202, to additional decommissioning treatments to increase the level of decommissioning of the tape cartridge. For example, a tape cartridge internally decommissioned by the tape library 101 and then ejected from the tape library 101, may be subjected to strong magnetic fields to degauss and erase any sensitive data stored on the magnetic tape of the tape cartridge.

Referring now to FIGS. 5A-5D, one embodiment of the decommission canister 204, (FIG. 2) is represented by a slim-profile decommission canister 500 which is shown from various angles. In this embodiment, the outer configuration of the decommission canister 500 is the same or substantially the same as that of known tape drive canisters such as the tape drive canister 106, schematically represented in FIG. 1. As a result, the decommission canister 500 is compatible with known canister bays of tape libraries in a manner similar to that of known tape drive canisters. Thus, the decommission canister 500 may be docked in known tape library canister bays interchangeably with known tape drive canisters. It is appreciated that in other embodiments, the outer configuration of the decommission canister 500 may be modified from that of known tape drive canisters, depending upon the particular application.

Figure 5B:
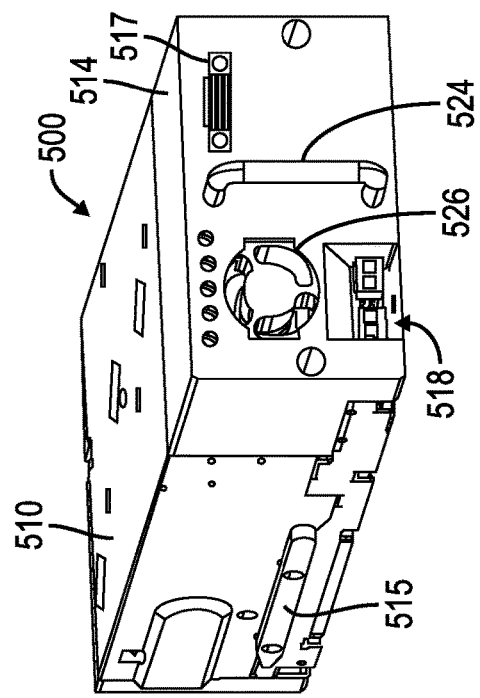
FIGS. 5A-5D depict various views of the outer configuration of the decommission canister of FIG. 2.
Figure 5D:
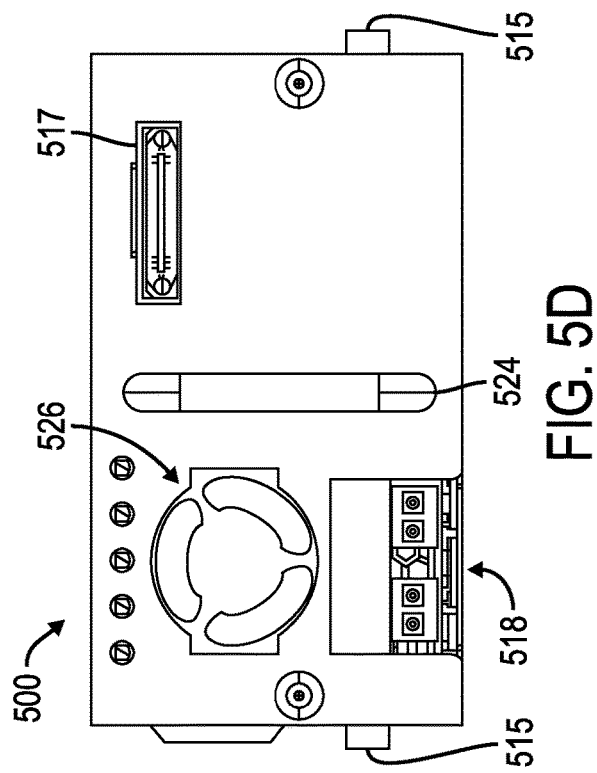
Figure 5A:
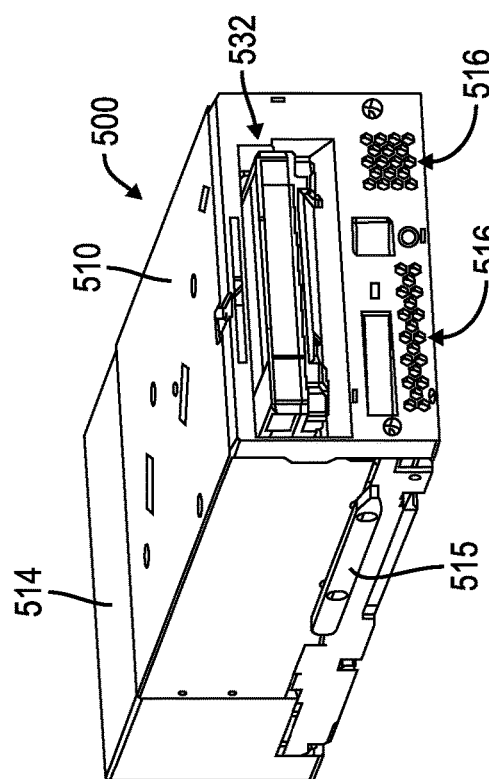
Figure 5C:
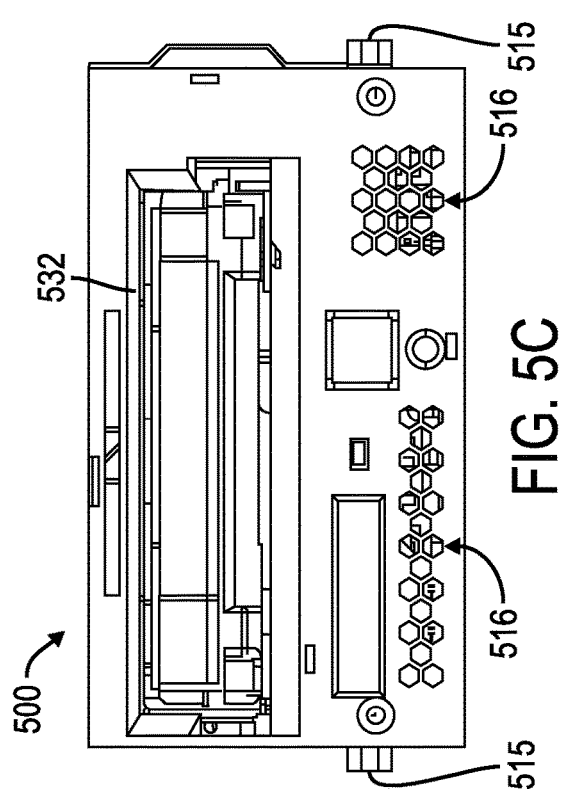

FIG. 5A is a front left top perspective view of the decommission canister 500, FIG. 5B is a rear right top perspective view of the decommission canister 500, FIG. 5C is a front elevation view of the decommission canister 500, and FIG. 5D is a rear elevation view of the decommission canister 500, according to one embodiment. As shown in FIGS. 5A-5B, the decommission canister 500 of this embodiment is an assembly of a decommission brick 510 which performs the tape cartridge decommissioning functions previously described. The assembly of the canister 500 further includes a housing 514 adapted for attaching to the decommission brick 510 and for supporting and containing the outer features of the decommission canister 500. In this embodiment, the decommission canister 500 is larger than the decommission brick 510 in a region where low profile side mounting features 515 are positioned, and not in any other region.

According to various embodiments, the low profile side mounting features 515 may be rails that extend from a side of the decommission brick 510 (as shown in FIGS. or from sides of the housing 514. In other embodiments, the side mounting features 515 may be pins, pegs, L-shaped, T-shaped, or other types of members that extend from sides of the decommission brick 510 and/or from sides of the housing 514 that engage corresponding connectors in the tape library. Alternatively, the features 515 may be grooves or holes that accept a corresponding connector positioned in the tape library, or any other type of low profile side mounting features known in the art. Regardless of the type of low profile side mounting feature 515 used, it is preferred that the mounting features of this embodiment do not protrude from the decommission canister 500 more than appropriate to provide support to the decommission canister 500 when inserted into a tape library bay. As a result, a slim profile is achieved which matches that of known slim profile tape drive canisters. However, it is appreciated that a decommission canister in accordance with the present description can have other profiles and match that of other known tape drive canisters which have a less slim profile.

In one embodiment, venting areas 516, one or more docking connectors 517 adapted for power, communication, and fiber channel connections 518, a handle 524 for the decommission canister 500 and fan exhaust areas 526 may be provided within front or rear faces of the decommission brick 510, as appropriate. For example, FIG. 5C shows a front view of the decommission canister 500 according to one embodiment. The low profile side mounting features 515 extend from the decommission canister 500 only slightly, to allow closer packing with tape drive canisters in the tape library. Also viewable is a tape cartridge loading mechanism 532 of the canister-cartridge mechanical mounting components 236 (FIG. 2) and venting areas 516. Also, in some embodiments, the housing 514 may extend to this portion of the decommission brick 510 to provide additional support when installed in the tape library. However, in other embodiments, a front portion of the housing 514 may be omitted in situations where a housing 514 positioned on the rear portion of the decommission brick 510 is sufficient to provide support when installed in the tape library.

FIG. 5D shows a rear view of the decommission canister 500 according to one embodiment. The housing 514 (FIG. 5B) in this rear portion of the decommission canister 500 is adapted to include library-canister electrical docking components 110 (FIG. 1) such as the electrical docking connections 517 to power the decommission brick 510, and electrical docking connections 518 to provide communications to the tape library. As shown in FIGS. 5B and 5D, the docking connections 518 of this embodiment are positioned separate from the docking connectors 517. It is appreciated that the electrical docking components may be incorporated into a single docking component, depending upon the particular application. are not necessarily this way and may be incorporated into the docking connector 517 in some approaches.

Here too, the low profile side mounting features 515 extend from the rear of the decommission canister 500 only slightly, to allow close packing with tape drive components in the tape library. Also, the handle 524 is located on the rear side to provide a technician with a suitable grip point to facilitate gripping the decommission canister 500 while installing in or removing from a bay in the tape library. The housing 514 further includes a fan exhaust 526 in this embodiment. It is appreciated that positioning components on the rear of the decommission canister 500 facilitates close packing with tape drive canisters in the tape library 101 (FIG. 1). However, it is further appreciated that positioning of components on the exterior of the housing 514 and the decommission brick 510 may vary, depending upon the particular application.

The tape library 101 and the slim profile decommission canister 500 also have rear mechanical docking features which further allow for decommission canisters and tape drive canisters to be positioned very close to each other within a tape library enclosure provided by the frame of the tape library. One arrangement of this close packing is shown in FIGS. 6A-6C, according to one embodiment of the tape library 101.

Figure 6C:
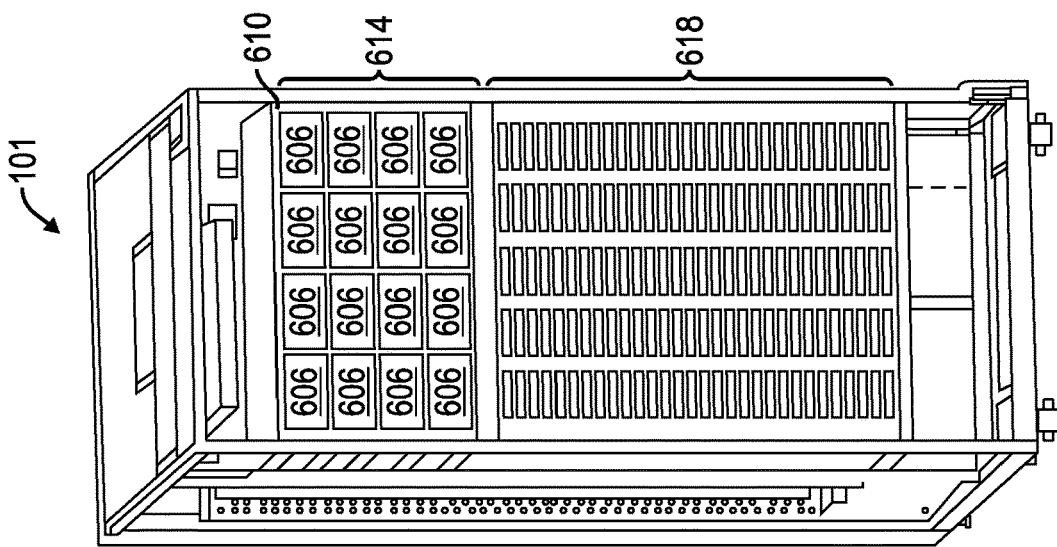
FIGS. 6A-6C depict various views of the tape library of FIG. 1.
Figure 6B:
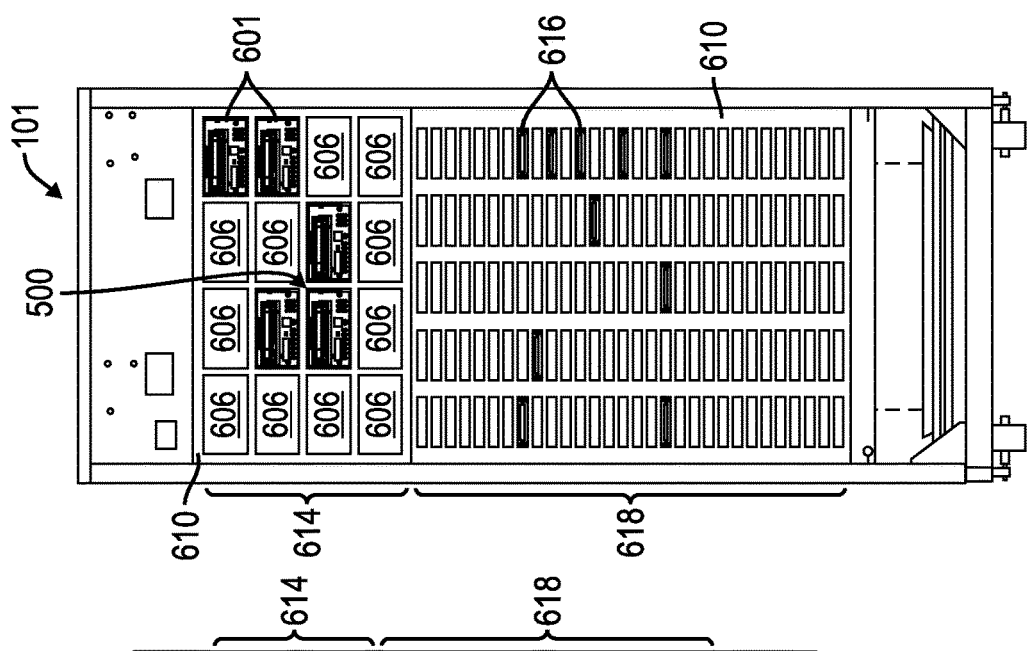
Figure 6A:
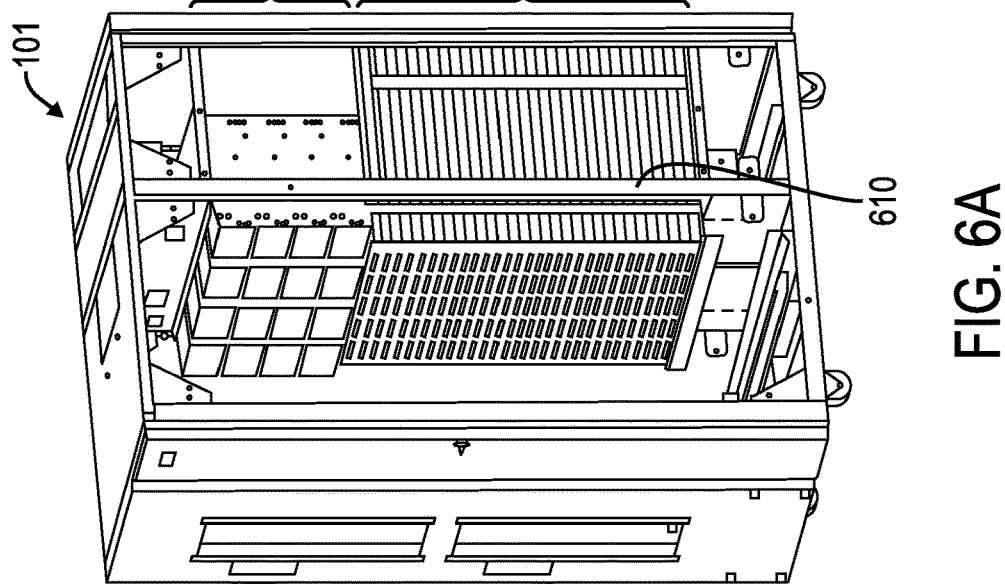

FIG. 6A is an isometric view of the tape library 101 in which the robotic accessor of the tape library 101 is not shown for purposes of clarity. FIG. 6B is a front view of the tape library 101 with the front door removed to better show the dense packing of canisters including tape drive canisters 601 and a decommission canister 500. FIG. 6C shows a rear view of the tape library 101 with the rear door removed to show the dense packing of canister bays 606 each of which is adapted for accepting canisters including either a decommission canister 500 (FIG. 6B) or a tape drive canister 601 (FIG. 6B).

In this embodiment, the canister bays 606 of the tape library 101 have a known inner configuration compatible with the outer configuration of known tape drive canisters 601 for docking in a canister bay 606. In one aspect of tape cartridge decommissioning in accordance with the present description, the outer configuration of each decommission canister 500 (FIG. 6B) is the same or substantially the same as that of known tape drive canisters 601 (FIG. 6B) schematically represented in FIG. 1 as a tape drive cannister $106_1$, $106_2$, . . . $106_n$. As a result, each decommission canister 500 is fully compatible with known docking bays 606 of tape libraries. Thus, the decommission canister 500 may be docked in known tape library docking bays 606 interchangeably with known tape drive canisters 601. It is appreciated that in some embodiments, tape library docking bays may be modified from known designs, to accommodate a decommission canister 500 as described herein.

As can be seen from FIGS. 6A-6C, the canisters 500, 601 may be close packed into the tape library frame 610 of the tape library 101, thereby allowing, according to one embodiment, at least sixteen tape drive and decommission canisters 500, 601 to be positioned in a canister bay array 614 in an upper portion of the frame 610 while a plurality of tape cartridges 616 are capable of being stored in a plurality of tape cartridge storage shelves 618 in a lower portion of the frame 610.

Figure 7A:
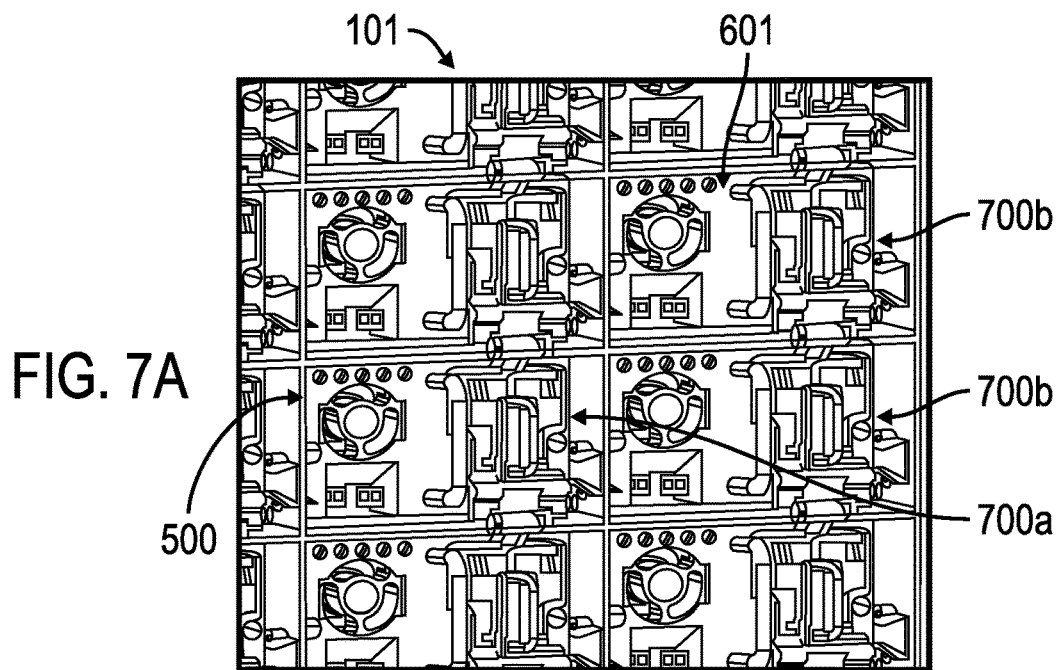
FIGS. 7A and 7B depict a closed position and an open position, respectively, of a latching mechanism for a decommission canister docked in the tape library of FIGS. 6A-6C.
Figure 7B:
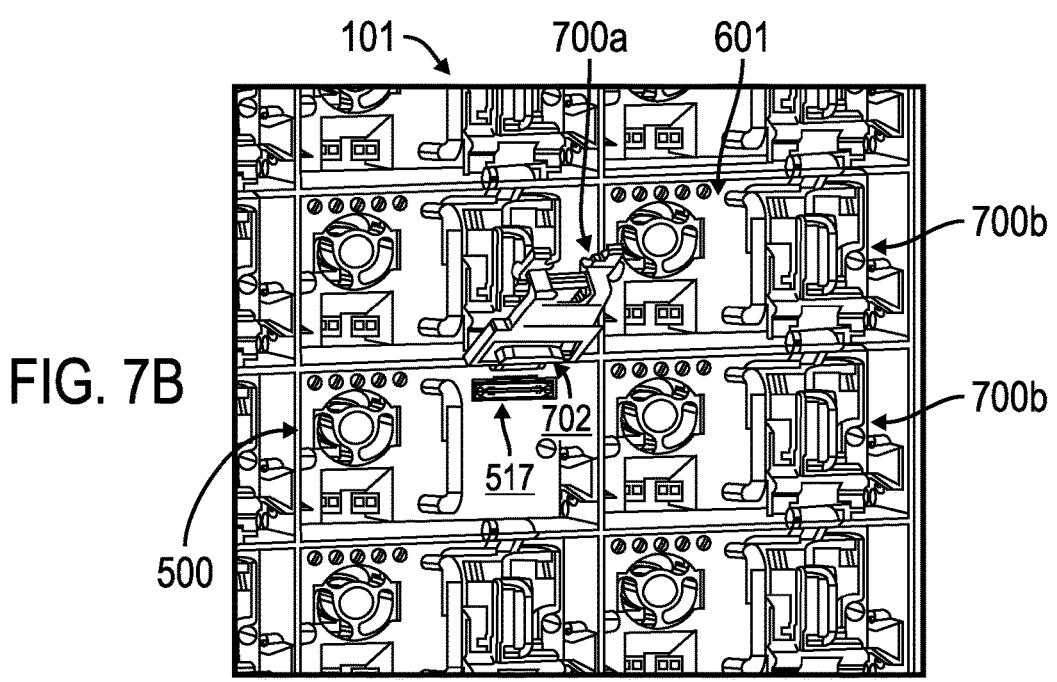

In a manner the same as or similar to that of known slim tape drive canisters, the slim form factor decommission canister 500 has the ability to be 'hot docked' into the frame 610 of the tape library 101 and mechanically latched into the frame 610 as shown in FIGS. 7A-7B. In one embodiment. A pivotal latching mechanism 700a is pivotally disposed on the frame 610 instead of the decommission canister 500. In this embodiment, the latching mechanism 700a may be pivoted up out of the way to allow for the canister 500 to be inserted in or removed from a particular canister bay 606 of the frame 610 It is appreciated that in other embodiments, a pivoting latch may pivot upward, downward, or horizontally to either side into a space behind another, adjacent canister 500, to allow for the canister 500 in a particular bay 606 of the frame 610 to be inserted or removed. In one embodiment, the latching mechanism 700a may be the same as or substantially similar to a known latching mechanism 700b for latching a known tape drive cannister 601 to the frame 610. It is appreciated that in other embodiments, the latching mechanism 700a may be modified from known latching mechanisms, depending upon the particular application.

Also, integrated into this pivoting latching mechanism 700a is a library docking connector 702 that is cabled (cable not shown in the figures) to a power system and a communications system of the automated tape library 101. The act of latching the decommission canister 500 in place in the tape library 101 fully seats this library docking connector 702, and the act of unlatching the decommission canister 500 from the tape library and pivoting the latching mechanism 700a away from the decommission canister 500 unseats the docking connector 702 and disconnects the decommission canister 500 from the power system and the communications system of the automated tape library 101. The library docking connector 702, in one approach, is adapted to couple to the docking connector 517 (FIGS. 5B and 5D) of the decommission canister 500.

Although the diagrams in the figures illustrate how this slim profile, rear docking decommission canister 500 may fit in a large, enterprise class tape library, use of the embodiments and descriptions herein is not be limited to this implementation only. This slim profile may also be advantageous in smaller, rack-mount tape libraries where there is also an increased demand for higher densities of tape drives. A slim decommission canister profile may be able to accommodate more tape drive and decommission canisters in a smaller tape library.

Figure 8A:
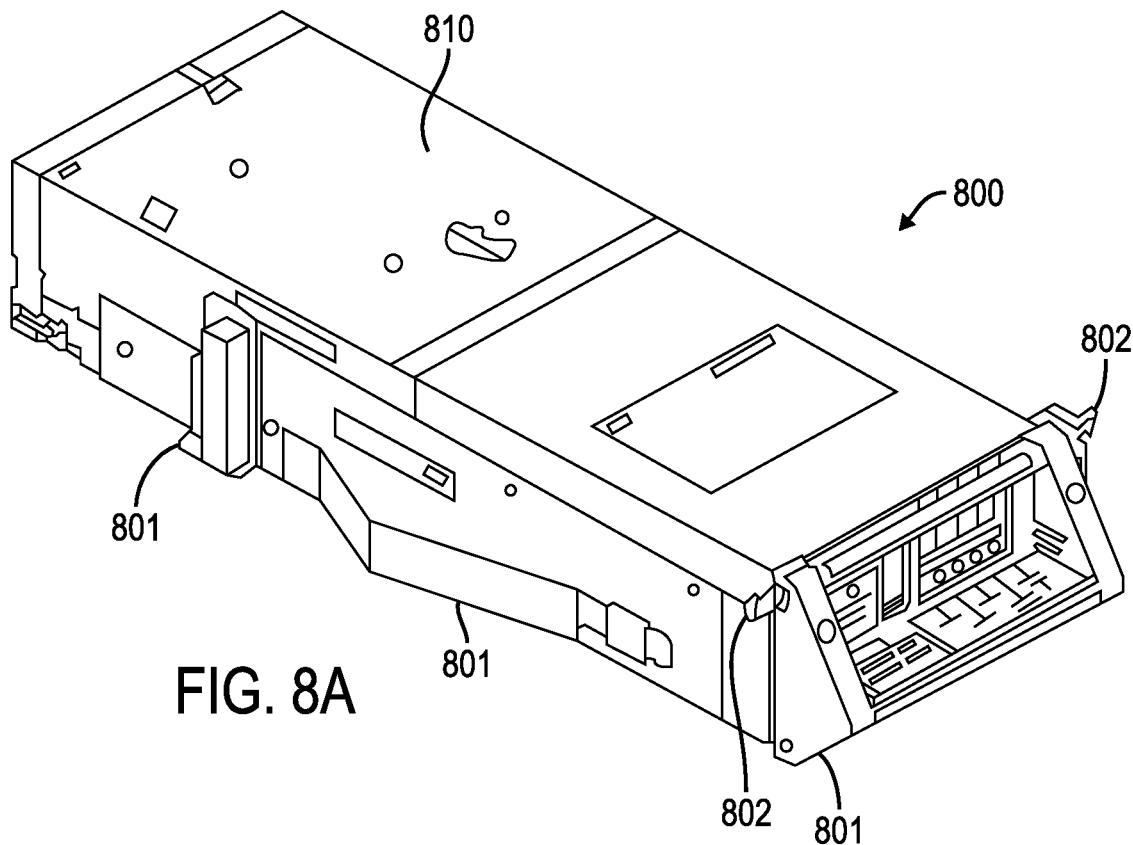
FIGS. 8A-8B depict various views of the outer configuration of an alternative embodiment of the decommission canister of FIG. 2.
Figure 8B:
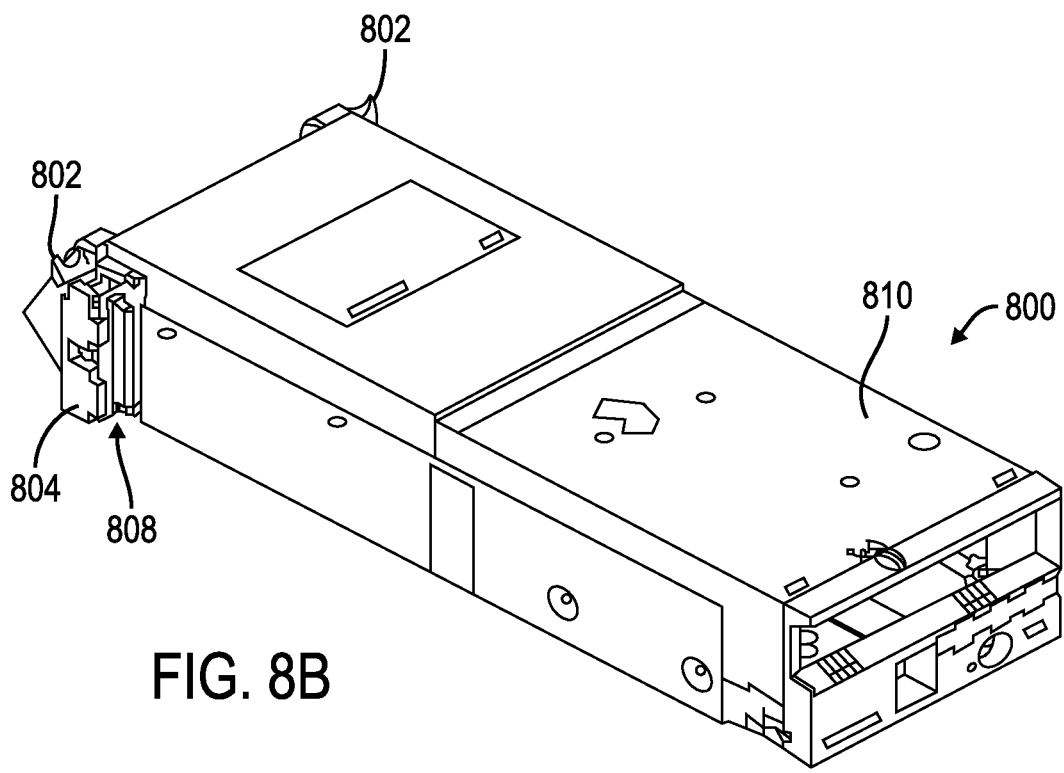

FIGS. 8A-8B depict an alternative embodiment of the outer configuration of decommission canister 800 in accordance with the present description. FIG. 8A shows a rear perspective view of a the decommission canister 800. FIG. 8B shows a front perspective view of the decommission canister 800. The outer configuration of the decommission canister 800 is the same or similar to that of another known tape drive canister. Accordingly, the decommission canister 800 is also configured to be accepted by a known tape library canister bay of an automated tape library.

In this embodiment, FIGS. 8A-8B show several components 801 that may be used to achieve a mechanical docking to an automated tape library. Also shown are latches 802 for mechanical docking to a tape library canister bay, a side-docking card 804 to allow mechanical docking into the tape library canister bay, a front-facing electrical docking connector 808 for electrical communication with the tape library canister bay. The decommission brick 810 is coupled to the canister 800.

One or more of the controllers 116 (FIG. 1) and 216 (FIG. 2) of the tape library 101 may be implemented as program modes which may comprise routines, programs, objects, components, logic, data structures, and so on that perform particular tasks or implement particular abstract data types. The program components and hardware devices of the library 101 of FIG. 1 may be implemented in one or more computer systems, where if they are implemented in multiple computer systems, then the computer systems may communicate over a network.

Logic features and operations of magnetic media decommissioning in accordance with the present description, may be implemented in one or more of the computer 102 (FIG. 1), the library controller 116 (FIG. 1), or the decommission canister controller 216 (FIG. 2), alone or in combination. Program components of one or more of the controllers 116 (FIG. 1) and 216 (FIG. 2), and the computer 102 (FIG. 1) may be accessed by a processor from memory to execute. Alternatively, some or all logic features and operations of controllers 116, 216 and computer 102 may be implemented in separate hardware devices, such as Application Specific Integrated Circuit (ASIC) hardware devices.

The present invention may be a system, device, method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 9:
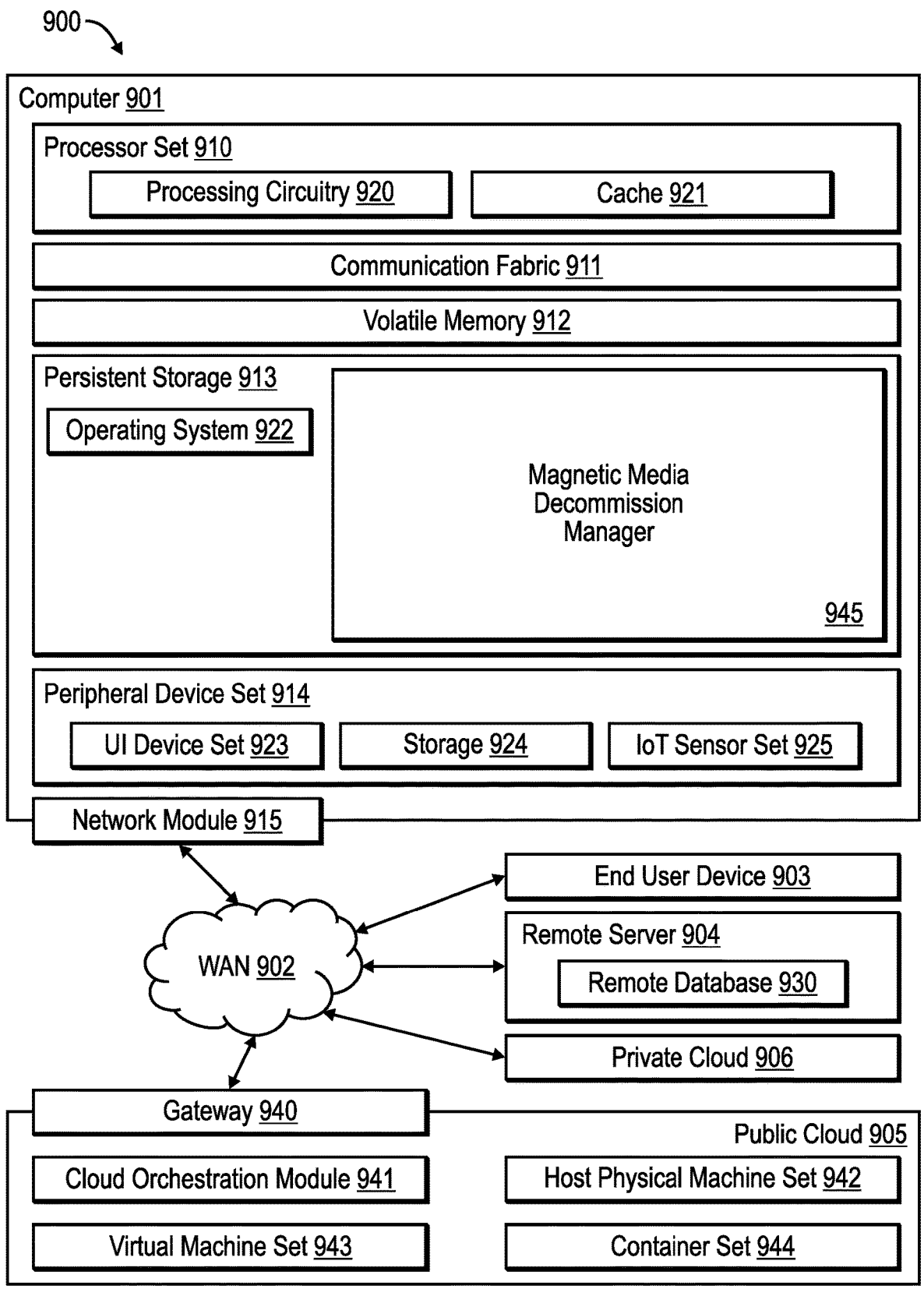
FIG. 9 illustrates a computing environment in which the components employing direct resistance measurement in accordance with the present description may be implemented.

FIG. 9 depicts a computing environment 900 which contains an example of an environment for the execution of at least some of the computer code involved in performing the inventive methods, including magnetic media decommissioning in accordance with the present description. Computing environment 900 includes, for example, computer 901, wide area network (WAN) 902, end user device (EUD) 903, remote server 904, public cloud 905, and private cloud 906. In this embodiment, computer 901 includes processor set 910 (including processing circuitry 920 and cache 921), communication fabric 911, volatile memory 912, persistent storage 913 (including operating system 922 and block 901, as identified above), peripheral device set 914 (including user interface (UI) device set 923, storage 924, and Internet of Things (IoT) sensor set 925), and network module 915. Remote server 904 includes remote database 930. Public cloud 905 includes gateway 940, cloud orchestration module 941, host physical machine set 942, virtual machine set 943, and container set 944.

COMPUTER 901 may take the form of a desktop computer, laptop computer, tablet computer, smart phone, smart watch or other wearable computer, server, mainframe computer, quantum computer or any other form of computer or mobile device now known or to be developed in the future that is capable of running a program, accessing a network or querying a database, such as remote database 930. For instance, the computer 901 may comprise the library controller 116 (FIG. 1), or the decommission canister controller 216 (FIG. 2) or the computer 102 (FIG. 1), alone or in combination. As is well understood in the art of computer technology, and depending upon the technology, performance of a computer-implemented method may be distributed among multiple computers and/or between multiple locations. On the other hand, in this presentation of computing environment 900, detailed discussion is focused on a single computer, specifically computer 901, to keep the presentation as simple as possible. Computer 901 may be located in a cloud, even though it is not shown in a cloud in FIG. 9. On the other hand, computer 901 is not required to be in a cloud except to any extent as may be affirmatively indicated.

PROCESSOR SET 910 includes one, or more, computer processors of any type now known or to be developed in the future. Processing circuitry 920 may be distributed over multiple packages, for example, multiple, coordinated integrated circuit chips. Processing circuitry 920 may implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set may be located "off chip." In some computing environments, processor set 910 may be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 101, at least some of the instructions for performing the inventive methods may be stored in persistent storage 913.

COMMUNICATION FABRIC 911 is the signal conduction path that allows the various components of computer 901 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 912 is any type of volatile memory now known or to be developed in the future. Examples include dynamic type random access memory (RAM) or static type RAM. Typically, volatile memory 912 is characterized by random access, but this is not required unless affirmatively indicated. In computer 901, the volatile memory 912 is located in a single package and is internal to computer 901, but, alternatively or additionally, the volatile memory may be distributed over multiple packages and/or located externally with respect to computer 901.

PERSISTENT STORAGE 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 may be a read only memory (ROM), but typically at least a portion of the persistent storage allows writing of data, deletion of data and re-writing of data. Some familiar forms of persistent storage include magnetic disks and solid-state storage devices. Operating system 922 may take several forms, such as various known proprietary operating systems or open-source Portable Operating System Interface-type operating systems that employ a kernel. In one embodiment, components of magnetic media decommission manager 945 in accordance with the present description, includes at least some of the computer code involved in performing the inventive methods, including program components of the controller components 116 (FIG. 1), 216 (FIG. 2) and computer 102 (FIG. 1) of the computer system 100 (FIG. 1).

PERIPHERAL DEVICE SET 914 includes the set of peripheral devices of computer 901. Data communication connections between the peripheral devices and the other components of computer 901 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 923 may include components such as a display screen, speaker, microphone, wearable devices (such as goggles and smart watches), keyboard, mouse, printer, touchpad, game controllers, and haptic devices. Storage 924 includes in one embodiment a tape library such as the tape library 101 (FIG. 1). Storage 924 may also include other external storage, such as an external hard drive, or insertable storage, such as an SD card. Storage 924 may be persistent and/or volatile. In some embodiments, storage 924 may include a quantum computing storage device for storing data in the form of qubits. In embodiments where computer 901 is required to have a large amount of storage (for example, where computer 901 locally stores and manages a large database) then this storage may be provided by peripheral storage devices designed for storing very large amounts of data, such as a storage area network (SAN) that is shared by multiple, geographically distributed computers. IoT sensor set 925 is made up of sensors that can be used in Internet of Things applications. For example, one sensor may be a thermometer and another sensor may be a motion detector.

NETWORK MODULE 915 is the collection of computer software, hardware, and firmware that allows computer 901 to communicate with other computers through WAN 902. Network module 915 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (for example, embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN 902 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 903 is any computer system that is used and controlled by an end user (for example, a customer of an enterprise that operates computer 901) and may take any of the forms discussed above in connection with computer 901. EUD 903, which may include the components of a host 102 (FIG. 1) or a controller 116 (FIG. 1 or controller 216 (FIG. 2), typically sends and receives helpful and useful data which would typically be communicated through network module 915 of computer 901 through WAN 902 to EUD 903. In this way, EUD 903 can display, or otherwise present, useful data to be stored or read. In some embodiments, EUD 903 may be a client device, such as thin client, heavy client, mainframe computer, desktop computer and so on.

REMOTE SERVER 904 is any computer system that serves at least some data and/or functionality to computer 901. Remote server 904 may be controlled and used by the same entity that operates computer 901. Remote server 904 may provide for the execution of at least some of the computer code involved in performing the inventive methods, including magnetic media decommission management in accordance with the present description.

PUBLIC CLOUD 905 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs may be stored as images and may be transferred among and between the various physical machine hosts, either as images or after instantiation of the VCE. Cloud orchestration module 941 manages the transfer and storage of images, deploys new instantiations of VCEs and manages active instantiations of VCE deployments.

Gateway 940 is the collection of computer software, hardware, and firmware that allows public cloud 905 to communicate through WAN 902.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 906 is similar to public cloud 905, except that the computing resources are only available for use by a single enterprise. While private cloud 906 is depicted as being in communication with WAN 902, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 905 and private cloud 906 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for a tape library having a tape cartridge having magnetic tape wound around a reel to form layers of magnetic tape, wherein the computer program product comprises a non-transitory computer readable storage medium having program instructions embodied therewith, the program instructions executable by a processor of the tape library to cause operations, the operations comprising:
   receiving selection of a tape cartridge for decommissioning in a tape library;
   using tape library robotic accessor, moving a selected tape cartridge to a decommission workstation within the tape library;
   mounting the selected tape cartridge to a decommission canister at the decommission workstation; and
   activating a fusing element of the decommission canister to fuse together layers of magnetic tape of the selected tape cartridge mounted to the decommission canister, so that the selected tape cartridge is decommissioned within the tape library to have a decommissioned status.

2. The computer program product of claim 1 wherein the operations further comprise using the decommission canister, rotating a reel of the tape cartridge carrying the magnetic tape of the cartridge while activating the fusing element of the decommission canister to fuse together layers of the magnetic tape of the selected tape cartridge at different rotational areas of the magnetic tape on the tape cartridge reel.

3. The computer program product of claim 1 wherein the operations further comprise:
   unmounting the decommissioned tape cartridge from the decommission canister at the decommission workstation;
   using tape library robotic accessor, moving the decommissioned tape cartridge from the decommission workstation within the tape library to a reading/writing workstation within the tape library;
   mounting the decommissioned tape cartridge to a tape drive at the reading/writing workstation; and activating the tape drive to attempt to read from the decommissioned tape drive mounted to the tape drive to confirm the decommissioned status of the decommissioned tape cartridge.

4. The computer program product of claim 3 wherein the operations further comprise;
unmounting the decommissioned tape cartridge from the tape drive;
using tape library robotic accessor, moving the decommissioned tape cartridge from the reading/writing workstation within the tape library to a tape cartridge ejection workstation within the tape library; and
ejecting the decommissioned tape cartridge from the tape library.

5. The computer program product of claim 1 wherein activating the fusing element includes one of directing heat from a heating element of the decommission canister at layers of magnetic tape of the selected tape cartridge to melt together layers of magnetic tape of the selected tape cartridge within the tape library, and directing vibrational waves from an ultrasonic element of the decommission canister at layers of magnetic tape of the selected tape cartridge to weld together layers of magnetic tape of the selected tape cartridge within the tape library, wherein unwinding of the magnetic tape is inhibited.

6. The computer program product of claim 1 wherein activating the fusing element includes controlling activation of the fusing element so as to prevent melting of a tape cartridge outer shell of the selected tape cartridge while fusing together layers of magnetic tape of the selected tape cartridge mounted to the decommission canister.

7. The computer program product of claim 1 wherein mounting the selected tape cartridge to a decommission canister at the decommission workstation includes actuating mechanical mounting components of the decommission canister, to provide access by the fusing element of the decommission canister to the magnetic tape of the selected tape cartridge, to fuse together layers of magnetic tape of the selected tape cartridge mounted to the decommission canister.

8. A tape library for use with a plurality of tape cartridges disposed within the tape library, each tape cartridge having a magnetic tape wound around a reel in layers in the tape cartridge, comprising:
a tape library enclosure which includes a frame having and a plurality of canister bays, and a plurality of tape cartridge shelves, each tape cartridge shelf configured to carry a tape cartridge having magnetic tape for storing data;
a tape drive canister docked in a canister bay and having a tape drive configured to read data from and write data to a magnetic tape wound in layers in a tape cartridge within the tape library; and
a decommission canister docked in a canister bay and having a fusing element configured to fuse together at least a portion of layers of magnetic tape of a tape cartridge within the tape library, to decommission the tape cartridge.

9. The tape library of claim 8 further comprising:
a robotic accessor configured to carry a tape cartridge within the tape library enclosure in a path which includes a decommission workstation which includes the decommission canister for mounting a tape cartridge with the decommission canister for decommissioning the tape cartridge within the tape library enclosure so that the tape cartridge has a decommissioned status.

10. The tape library of claim 9 wherein the robotic accessor is further configured to carry a decommissioned tape cartridge within the tape library enclosure in a path which includes a read/write workstation which includes the tape drive for mounting a decommissioned tape cartridge in the tape drive to confirm the decommissioned status of the decommissioned tape cartridge.

11. The tape library of claim 8 wherein the fusing element is one of a heating element adapted to emit heat directed at layers of magnetic tape of a tape cartridge to melt together at least a portion of layers of magnetic tape of a tape cartridge within the tape library, and an ultrasonic element adapted to direct vibrational waves at layers of magnetic tape of a tape cartridge to weld together at least a portion of layers of magnetic tape of a tape cartridge within the tape library, wherein unwinding of the magnetic tape is inhibited.

12. The tape library of claim 8 further comprising docking components adapted to at least one of mechanically and electrically connect the decommission canister to the tape library canister bay in a docked position within the tape library canister bay.

13. The tape library of claim 8 wherein the tape cartridge has an outer shell housing the magnetic tape and wherein the decommission canister further has a decommission controller adapted to control activation of the fusing element so as to prevent melting of the tape cartridge outer shell.

14. The tape library of claim 8 wherein the decommission canister has mechanical mounting components adapted to mount a tape cartridge to the decommission canister for decommissioning a tape cartridge mounted to the decommission canister.

15. A method, comprising:
receiving selection of a tape cartridge for decommissioning in a tape library;
using tape library robotic accessor, moving a selected tape cartridge to decommission workstation within the tape library, the selected tape cartridge having magnetic tape wound around a reel to form layers of magnetic tape;
mounting the selected tape cartridge to the decommission workstation; and
activating a fusing element of the decommission workstation to fuse together layers of magnetic tape of the selected tape cartridge mounted to the decommission workstation, so that the selected tape cartridge is decommissioned within the tape library to have a decommissioned status.

16. The method of claim 15 further comprising rotating a reel of the tape cartridge carrying the magnetic tape of the cartridge and activating the fusing element of the decommission workstation to fuse together layers of the magnetic tape of the selected tape cartridge at different rotational areas of the magnetic tape on the tape cartridge reel.

17. The method of claim 15 further comprising:
unmounting the decommissioned tape cartridge from the decommission workstation;
using tape library robotic accessor, moving the decommissioned tape cartridge from the decommission workstation within the tape library to a reading/writing workstation within the tape library;
mounting the decommissioned tape cartridge to a tape drive at the reading/writing workstation; and
activating the tape drive to attempt to read from the decommissioned tape drive mounted to the tape drive to confirm the decommissioned status of the decommissioned tape cartridge.

18. The method of claim 17 further comprising;
unmounting the decommissioned tape cartridge from the tape drive;
using tape library robotic accessor, moving the decommissioned tape cartridge from the reading/writing workstation within the tape library to a tape cartridge ejection workstation within the tape library; and
ejecting the decommissioned tape cartridge from the tape library.

19. The method of claim 15 wherein activating the fusing element includes one of directing heat from a heating element of the decommission workstation at layers of magnetic tape of the selected tape cartridge to melt together layers of magnetic tape of the selected tape cartridge within the tape library, and directing vibrational waves from an ultrasonic element of the decommission workstation at layers of magnetic tape of the selected tape cartridge to weld together layers of magnetic tape of the selected tape cartridge within the tape library, wherein unwinding of the magnetic tape is inhibited.

20. The method of claim 15 wherein activating the fusing element includes controlling activation of the fusing element so as to prevent melting of a tape cartridge outer shell of the selected tape cartridge while fusing together layers of magnetic tape of the selected tape cartridge mounted to the decommission workstation.

* * * * *